US012655334B2

(12) United States Patent
Daido et al.

(10) Patent No.: US 12,655,334 B2
(45) Date of Patent: Jun. 16, 2026

(54) PROVISIONAL FIXATION MATERIAL AND METHOD FOR PRODUCING ELECTRONIC COMPONENT

(71) Applicant: SEKISUI CHEMICAL CO., LTD., Osaka (JP)

(72) Inventors: Izumi Daido, Osaka (JP); Toshio Takahashi, Osaka (JP); Tokushige Shichiri, Osaka (JP); Satoshi Hayashi, Osaka (JP); Fumika Hoshino, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 246 days.

(21) Appl. No.: 18/025,730

(22) PCT Filed: Sep. 22, 2021

(86) PCT No.: PCT/JP2021/034877
§ 371 (c)(1),
(2) Date: Mar. 10, 2023

(87) PCT Pub. No.: WO2022/065388
PCT Pub. Date: Mar. 31, 2022

(65) Prior Publication Data
US 2023/0348767 A1 Nov. 2, 2023

(30) Foreign Application Priority Data
Sep. 23, 2020 (JP) ................................ 2020-159178
Sep. 23, 2020 (JP) ................................ 2020-159180
Sep. 23, 2020 (JP) ................................ 2020-159181

(51) Int. Cl.
*C09J 179/08* (2006.01)
*C09J 11/04* (2006.01)
*C09J 11/08* (2006.01)

(52) U.S. Cl.
CPC ............ *C09J 179/08* (2013.01); *C09J 11/04* (2013.01); *C09J 11/08* (2013.01); *C09J 2203/326* (2013.01); *C09J 2301/124* (2020.08); *C09J 2301/312* (2020.08); *C09J 2301/408* (2020.08); *C09J 2301/502* (2020.08)

(58) Field of Classification Search
None
See application file for complete search history.

(56) References Cited

U.S. PATENT DOCUMENTS 5,438,104 A 8/1995 Kishi et al.
2006/0229384 A1 10/2006 Sakayori
2007/0090299 A1* 4/2007 Kozakai .................... C09J 7/38 250/370.11
2012/0135251 A1* 5/2012 Jeong .................... C09J 179/08 524/588
2021/0017317 A1 1/2021 Umehara et al.
2021/0054197 A1 2/2021 Umehara et al.
2022/0162480 A1* 5/2022 Shichiri ............... C08G 73/125
2022/0169791 A1 6/2022 Sugawara et al.
2023/0312923 A1* 10/2023 Takahashi ............. C08G 73/12 522/83

FOREIGN PATENT DOCUMENTS

JP 5-32946 2/1993
JP 9-12712 1/1997
JP 2003-231872 8/2003
JP 2005-82628 3/2005
JP 2005314673 A * 11/2005 ............ C08G 73/10
JP 2011-74245 4/2011
JP 2012-251080 12/2012
JP 2013-505822 2/2013
JP 2013-79360 5/2013
JP 2013-194056 9/2013
JP 2013-199645 10/2013
JP 2015-193725 11/2015
JP 2016-113498 6/2016
JP 2017-48266 3/2017
JP 2017-73541 4/2017
JP 2017-105749 6/2017
JP 2017-121807 7/2017
JP 2017-173479 9/2017
JP 2017-222745 12/2017
JP 2018-531317 10/2018

(Continued)

OTHER PUBLICATIONS

Sigma-Aldrich product data sheet "1,4-Butanediol dimethacrylate" , retrived on Mar. 21, 2025 (Year: 2025).*
Machine translation of JP 2013199645 A (Year: 2013).*
Machine translation of JP 2003231872 A (Year: 2003).*
Machine translation of WO2015182469 A1 (Year: 2015).*
Robert J. Iredale et al., "Modern advances in bismaleimide resin technology: A 21st century perspective on the chemistry of addition polyimides", Progress in Polymer Science, 2017, vol. 69, pp. 1-21.

(Continued)

*Primary Examiner* — Anish P Desai
(74) *Attorney, Agent, or Firm* — Wenderoth, Lind & Ponack, L.L.P.

(57) ABSTRACT

The present invention aims to provide a temporary fixing material that is easily separable even after high-temperature processing at 300° C. or higher with an adherend fixed thereon. The present invention also aims to provide a method for producing an electronic component using the temporary fixing material. Provided is a temporary fixing material containing a photocurable adhesive, the photocurable adhesive containing a reactive resin containing a resin (1) having an imide skeleton in a backbone repeating unit, the temporary fixing material having a light transmittance at 405 nm of 10% or greater and a 5% weight loss temperature of 350° C. or higher.

26 Claims, No Drawings

(56) References Cited

FOREIGN PATENT DOCUMENTS

| | | |
|---|---|---|
| JP | 2018-203959 | 12/2018 |
| JP | 2020-84109 | 6/2020 |
| JP | 2020-132881 | 8/2020 |
| JP | 2020-525575 | 8/2020 |
| TW | 201116928 | 5/2011 |
| TW | 201542674 | 11/2015 |
| TW | 201942674 | 11/2019 |
| WO | 2011/037706 | 3/2011 |
| WO | 2015/182469 | 12/2015 |
| WO | 2017/027482 | 2/2017 |
| WO | 2017/111134 | 6/2017 |
| WO | 2018/155029 | 8/2018 |
| WO | 2018/237377 | 12/2018 |
| WO | 2019/188185 | 10/2019 |
| WO | 2019/188189 | 10/2019 |
| WO | 2019/189467 | 10/2019 |
| WO | 2020/012978 | 1/2020 |
| WO | 2020/137980 | 7/2020 |
| WO | 2020/189354 | 9/2020 |

OTHER PUBLICATIONS

International Search Report issued Dec. 14, 2021 in corresponding International (PCT) Application No. PCT/JP2021/034877.

International Search Report issued Nov. 9, 2021 in International (PCT) Application No. PCT/JP2021/034853.

U.S. Appl. No. 18/025,232, filed Mar. 8, 2023.

* cited by examiner

PROVISIONAL FIXATION MATERIAL AND METHOD FOR PRODUCING ELECTRONIC COMPONENT

TECHNICAL FIELD

The present invention relates to a temporary fixing material that is easily separable even after high-temperature processing at 300° C. or higher with an adherend fixed thereon. The present invention also relates to a method for producing an electronic component using the temporary fixing material.

BACKGROUND ART

During the processing of electronic components such as semiconductors, electronic components are fixed to supports using adhesive compositions or protected by adhesive tapes attached thereto for easier handling or less breakage of the electronic components. In the case where a thick wafer cut out from a highly pure silicon single crystal is ground to a thin wafer having a predetermined thickness, for example, the thick wafer is attached to a support using an adhesive composition.

Adhesive compositions and adhesive tapes thus used with electronic components are required to have high adhesiveness to firmly fixing electronic components during the processing, as well as separability from the electronic components without causing damage to the electronic components after the processing (hereafter, also referred to as "high adhesion and easy separation").

As a means for achieving high adhesion and easy separation, Patent Literature 1, for example, discloses an adhesive sheet produced using an adhesive in which to a side chain or main chain of a polymer is bonded a polyfunctional monomer or oligomer containing a radiation polymerizable functional group. The polymer is cured by irradiation with UV as it has the radiation polymerizable functional group, which allows lowering of the adhesion by irradiation with UV upon separation of the adhesive sheet, enabling separation without adhesive deposits.

CITATION LIST

Patent Literature

Patent Literature 1: JP H05-32946 A

SUMMARY OF INVENTION

Technical Problem

Recent higher-performance electronic components are subjected to various types of processing. For example, in the process of forming a thin metal film on a surface of an electronic component by sputtering, the processing is performed at high temperature of around 300° C. to 350° C. to form a thin metal film having higher electroconductivity. However, high-temperature processing at 300° C. or higher performed on an electronic component protected using a conventional adhesive composition or adhesive tape may cause a rise in adhesion, leading to insufficient lowering of the adhesion or the generation of adhesive deposits upon separation.

The present invention relates to a temporary fixing material that is easily separable even after high-temperature processing at 300° C. or higher with an adherend fixed thereon. The present invention also aims to provide a method for producing an electronic component using the temporary fixing material.

Solution to Problem

The present invention relates to a temporary fixing material containing a photocurable adhesive, the photocurable adhesive containing a reactive resin containing a resin (1) having an imide skeleton in a backbone repeating unit, the temporary fixing material having a light transmittance at 405 nm of 10% or greater and a 5% weight loss temperature of 350° C. or higher.

The present invention is described in detail below.

The present inventors investigated the use of a reactive resin containing a resin (1) having an imide skeleton in a backbone repeating unit for the photocurable adhesive in the temporary fixing material containing a photocurable adhesive. Such a photocurable adhesive uniformly and quickly polymerizes and crosslinks as a whole when irradiated with light. The resulting increase in the modulus of elasticity greatly decreases adhesion, which is expected to allow easy separation of the photocurable adhesive upon separation. However, when high-temperature processing at 300° C. or higher is performed with an adherend fixed on the photocurable adhesive, it is difficult to sufficiently prevent a rise in adhesion or the generation of adhesive deposits upon separation.

The present inventors made further investigation and found out that even a temporary fixing material that has high light transmission and allows photocuring reaction to sufficiently progress may generate adhesive deposits if it has insufficient heat resistance, and that even with high heat resistance, a rise in adhesion may occur if photocuring reaction insufficiently progresses.

In view of this, the present inventors investigated reducing a rise in adhesion by increasing the light transmission of the temporary fixing material for sufficient progress of the photocuring reaction in the photocurable adhesive, while also reducing decomposition at high temperature by improving the heat resistance of the temporary fixing material. As a result of investigation, the present inventors found out that adjusting the light transmittance at 405 nm and the 5% weight loss temperature of the temporary fixing material to specific ranges can prevent a rise in adhesion or the generation of adhesive deposits upon separation even when high-temperature processing at 300° C. or higher is performed. The present inventors found out that such a temporary fixing material can be easily separated upon separation, and thus completed the present invention.

The temporary fixing material of the present invention contains a photocurable adhesive.

The temporary fixing material of the present invention is not limited as long as it contains the photocurable adhesive; it may be a liquid temporary fixing adhesive or a temporary fixing adhesive sheet including a photocurable adhesive layer containing the photocurable adhesive.

The photocurable adhesive contains a reactive resin containing a resin (1) having an imide skeleton in a backbone repeating unit.

The resin (1) having an imide skeleton in a backbone repeating unit has very high heat resistance because of the imide skeleton, and is less likely to suffer degradation of the backbone even in high-temperature processing at 300° C. or higher. Therefore, the photocurable adhesive, containing the reactive resin containing the resin (1) having an imide skeleton in a backbone repeating unit, can prevent a rise in adhesion or the generation of adhesive deposits upon separation even when high-temperature processing at 300° C. or higher is performed.

As long as the reactive resin contains the resin (1) having an imide skeleton in a backbone repeating unit and the reactive resin as a whole has reactivity, the resin (1) having an imide skeleton in a backbone repeating unit itself may have reactivity or may have no reactivity. When the resin (1) having an imide skeleton in a backbone repeating unit itself has no reactivity, the reactive resin needs to contain a different component containing a reactive functional group so that the reactive resin as a whole has reactivity.

The resin (1) having an imide skeleton in a backbone repeating unit is not limited, but is preferably a resin (1-I) containing a double bond-containing functional group and having an imide skeleton in a backbone repeating unit, or a resin (1-II) not containing a double bond-containing functional group and having an imide skeleton in a backbone repeating unit. These resins (1) having an imide skeleton in a backbone repeating unit may be used alone or in combination of two or more thereof.

When containing the resin (1-I) containing a double bond-containing functional group and having an imide skeleton in a backbone repeating unit, the photocurable adhesive uniformly and quickly polymerizes and crosslinks as a whole when irradiated with light. The resulting increase in the modulus of elasticity greatly decreases adhesion. This can prevent a rise in adhesion or the generation of adhesive deposits upon separation.

Examples of the double bond-containing functional group include an optionally substituted maleimide group, an optionally substituted citraconimide group, an optionally substituted vinyl ether group, an optionally substituted allyl group, and an optionally substituted (meth)acrylic group. For higher heat resistance, an optionally substituted maleimide group is favorable among these.

The resin (1-I) containing a double bond-containing functional group and having an imide skeleton in a backbone repeating unit preferably has a double bond-containing functional group equivalent (weight average molecular weight/number of double bond-containing functional groups) of 4,000 or less. When the functional group equivalent is 4,000 or less, the photocurable adhesive can exhibit higher heat resistance. A resin containing double bond-containing groups at a density not lower than a certain level in the molecule has a shorter distance between crosslinking points, which presumably further reduces a rise in adhesion. The functional group equivalent is more preferably 3,000 or less, still more preferably 2,000 or less. The lower limit of the functional group equivalent is not limited but is practically about 600.

The resin (1-I) containing a double bond-containing functional group and having an imide skeleton in a backbone repeating unit preferably has a weight average molecular weight (Mw) of 1,000 or greater and 100,000 or less. When the weight average molecular weight is 1,000 or greater, the photocurable adhesive can easily form a film, and the resulting photocurable adhesive layer exhibits flexibility to some degree. Such an adhesive layer can exhibit high conformability to adherends with irregularities and be more easily separated upon separation. When the weight average molecular weight is 100,000 or less, it is possible to prevent the resin (1-I) containing a double bond-containing functional group and having an imide skeleton in a backbone repeating unit from having too low solubility in solvents. The weight average molecular weight is more preferably 1,500 or greater and 50,000 or less, still more preferably 2,000 or greater and less than 20,000.

The weight average molecular weight is measured by gel permeation chromatography (GPC) as a polystyrene equivalent molecular weight. Specifically, it can be measured using an APC system (produced by Waters Corporation, or its equivalent product) under the conditions of a mobile phase of THF, a flow rate of 1.0 mL/min, a column temperature of 40° C., a sample concentration of 0.2% by weight, and an RI/PDA detector. A column used may be HR-MB-M 6.0×150 mm (trade name, produced by Waters Corporation, or its equivalent product).

The resin (1-I) containing a double bond-containing functional group and having an imide skeleton in a backbone repeating unit may have a double bond-containing functional group in a side chain or at an end. Preferably, double bond-containing functional groups are present at both ends, more preferably at both ends and in a side chain. The double bond-containing functional groups at the ends of the resin (1-I) containing a double bond-containing functional group and having an imide skeleton in a backbone repeating unit have high reactivity and thus allow the photocurable adhesive to more sufficiently cure when irradiated with light. As a result, a rise in adhesion or the generation of adhesive deposits upon separation can be further prevented.

Additionally, the presence of a double bond-containing functional group in a side chain of the resin (1-I) containing a double bond-containing functional group and having an imide skeleton in a backbone repeating unit allows the photocurable adhesive to exhibit higher heat resistance. This is presumably because a shorter distance between crosslinking points can further reduce a rise in adhesion. Moreover, the presence of a double bond-containing functional group in a side chain of the resin (1-I) containing a double bond-containing functional group and having an imide skeleton in a backbone repeating unit makes it easy to adjust the functional group equivalent to be 4,000 or less while adjusting the weight average molecular weight to be 1,000 or greater. This allows the photocurable adhesive to have sufficient initial adhesion while further preventing a rise in adhesion or the generation of adhesive deposits upon separation.

Specific examples of the resin (1-I) containing a double bond-containing functional group and having an imide skeleton in a backbone repeating unit include the following resin: a resin (1-i) containing a structural unit represented by the following formula (1a), a structural unit represented by the following formula (1b), and a structural unit represented by the following formula (1c), and having ends represented by $X^1$ and $X^2$.

[Chem. 1]

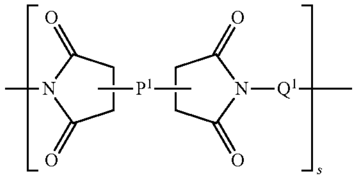

(1a)

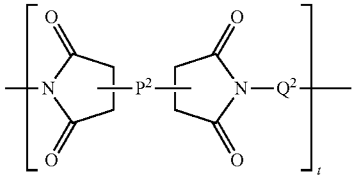

(1b)

-continued (1c)

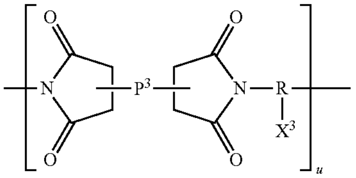

In the formulas (1a) to (1c), s>0, t≥0, and u≥0 are satisfied; $P^1$, $p^2$, and $P^3$ each independently represent an aromatic group; $Q^1$ represents a substituted or unsubstituted linear, branched, or cyclic aliphatic group; $Q^2$ represents a substituted or unsubstituted aromatic structure-containing group; R represents a substituted or unsubstituted branched aliphatic or aromatic group; and at least one selected from the group consisting of $X^1$, $X^2$, and $X^3$ represents a double bond-containing functional group.

In the formulas (1a) to (1c), $P^1$, $P^2$, and $P^3$ are preferably C5-C50 aromatic groups. When $P^1$, $p^2$, and $P^3$ are C5-C50 aromatic groups, the photocurable adhesive can exhibit higher heat resistance. In other words, the photocurable adhesive can further prevent a rise in adhesion or the generation of adhesive deposits upon separation even when high-temperature processing at 300° C. or higher is performed.

In the formula (1a), $Q^1$ is preferably a substituted or unsubstituted linear, branched, or cyclic C2-C100 aliphatic group. When $Q^1$ is a substituted or unsubstituted linear, branched, or cyclic C2-C100 aliphatic group, the photocurable adhesive can have high light transmission. Moreover, the photocurable adhesive layer containing the photocurable adhesive can exhibit high flexibility, and thus can exhibit high conformability to adherends with irregularities and be more easily separated upon separation.

$Q^1$ is also preferably an aliphatic group derived from a diamine compound described later. In particular, $Q^1$ is preferably an aliphatic group derived from a dimer diamine to achieve higher light transmission and higher flexibility and to allow the resin (1-I) containing a double bond-containing functional group and having an imide skeleton in a backbone repeating unit to have higher compatibility with solvents and other components to facilitate the formation of a photocurable adhesive layer.

More specifically, for example, the aliphatic group derived from a dimer diamine is preferably at least one selected from the group consisting of a group represented by the following formula (4-1), a group represented by the following formula (4-2), a group represented by the following formula (4-3), and a group represented by the following formula (4-4). More preferred among these is a group represented by the following formula (4-2).

[Chem. 2]

(4-1)

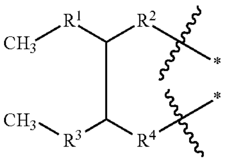

-continued (4-2)

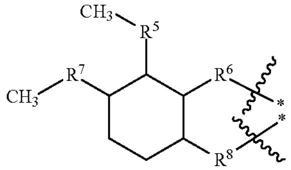

(4-3)

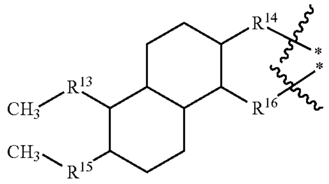

(4-4)

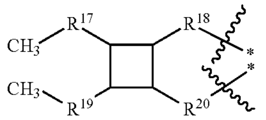

In the formulas (4-1) to (4-4), $R^1$ to $R^8$ and $R^{13}$ to $R^{20}$ each independently represent a linear or branched hydrocarbon group. Herein, "*" represents a bond; "*" binds to N in each of the formulas (1a) to (1c).

In the formulas (4-1) to (4-4), the hydrocarbon groups represented by $R^1$ to $R^8$ and $R^{13}$ to $R^{20}$ are not limited and may be saturated hydrocarbon groups or unsaturated hydrocarbon groups. A combination of $R^1$ and $R^2$, a combination of $R^3$ and $R^4$, a combination of $R^5$ and $R^6$, a combination of $R^7$ and $R^8$, a combination of $R^{13}$ and $R^{14}$, a combination of $R^{15}$ and $R^{16}$, a combination of $R^{17}$ and $R^{18}$, and a combination of $R^{19}$ and $R^{20}$ each preferably has a total carbon number of 7 or greater and 50 or less. When the total carbon number is within the above range, the photocurable adhesive can have higher light transmission, and the photocurable adhesive layer containing the photocurable adhesive can exhibit higher flexibility. Moreover, the resin (1-I) containing a double bond-containing functional group and having an imide skeleton in a backbone repeating unit can have even higher compatibility with solvents and other components. The total carbon number is more preferably 9 or greater, still more preferably 12 or greater, even more preferably 14 or greater. The total carbon number is more preferably 35 or less, still more preferably 25 or less, even more preferably 18 or less.

No limitation is given on the optical isomerism of the group represented by the formula (4-1), the group represented by the formula (4-2), the group represented by the formula (4-3), and the group represented by the formula (4-4), and any optical isomers may be included.

In the formula (1b), $Q^2$ is preferably a substituted or unsubstituted C5-C50 aromatic structure-containing group. When $Q^2$ is a substituted or unsubstituted C5-C50 aromatic structure-containing group, the photocurable adhesive can exhibit higher heat resistance. In other words, the photocurable adhesive can further prevent a rise in adhesion or the generation of adhesive deposits upon separation even when high-temperature processing at 300° C. or higher is performed.

In the formula (1c), R is preferably a substituted or unsubstituted branched C2-C100 aliphatic group or aromatic group. When R is a substituted or unsubstituted branched C2-C100 aliphatic group or aromatic group, the photocurable adhesive layer containing the photocurable adhesive can exhibit high flexibility, and thus can exhibit high conformability to adherends with irregularities and be more easily separated upon separation.

In the formula (1c), preferably, R is an aromatic ester group- or aromatic ether group-containing aromatic group, and the aromatic ester group or the aromatic ether group in R binds to $X^3$.

Here, the "aromatic ester group" refers to a group in which an ester group directly binds to an aromatic ring and the "aromatic ether group" refers to a group in which an ether group directly binds to an aromatic ring. When an aromatic group thus serves as a site binding to an ester group or ether group, the photocurable adhesive can exhibit higher heat resistance. In other words, the photocurable adhesive can further prevent a rise in adhesion or the generation of adhesive deposits upon separation even when high-temperature processing at 300° C. or higher is performed. As $X^3$ binds to R via an aromatic ester group or aromatic ether group, the double bond in $X^3$ does not conjugate with R, so that polymerization and crosslinking under heating or irradiation with light are not disturbed.

In the resin (1-I) containing a double bond-containing functional group and having an imide skeleton in a backbone repeating unit, at least one selected from the group consisting of $X^1$, $X^2$, and $X^3$ is a double bond-containing functional group (crosslinkable unsaturated bond). Preferably, at least $X^3$ is a double bond-containing functional group. When at least $X^3$ is a double bond-containing functional group, the photocurable adhesive can exhibit higher heat resistance. In other words, the photocurable adhesive can further prevent a rise in adhesion or the generation of adhesive deposits upon separation even when high-temperature processing at 300° C. or higher is performed.

In the case where any of $X^1$, $X^2$, and $X^3$ is a functional group other than the double bond-containing functional group (functional group not containing a double bond), examples of the functional group not containing a double bond each independently include an aliphatic group, an alicyclic group, an aromatic group, an acid anhydride, and an amine compound. Specific examples include a one-end-unreacted product of an acid anhydride that is a raw material of the resin (1-I) containing a double bond-containing functional group and having an imide skeleton in a backbone repeating unit and a one-end-unreacted product of a diamine compound that is a raw material of the resin (1-I).

In the resin (1-I) containing a double bond-containing functional group and having an imide skeleton in a backbone repeating unit, examples of the double bond-containing functional group include an optionally substituted maleimide group, an optionally substituted citraconimide group, an optionally substituted vinyl ether group, an optionally substituted allyl group, and an optionally substituted (meth) acrylic group. For higher heat resistance, preferred is an optionally substituted maleimide or allyl group among these. For particularly high adhesiveness, more preferred is a tri(iso)cyanurate group containing one or more allyl groups.

In the formulas (1a) to (1c), s, t, and u respectively correspond to the amounts (mol %) of the structural unit represented by the formula (1a), the structural unit represented by the formula (1b), and the structural unit represented by the formula (1c) in the resin (1-I) containing a double bond-containing functional group and having an imide skeleton in a backbone repeating unit.

The amount (s) of the structural unit represented by the formula (1a) is greater than 0 mol %, preferably 30 mol % or greater, more preferably 50 mol % or greater and is preferably 90 mol % or less, more preferably 80 mol % or less. The amount (t) of the structural unit represented by the formula (1b) is 0 mol % or greater, preferably 5 mol % or greater, more preferably 10 mol % or greater, still more preferably 20 mol % or greater and is preferably 50 mol % or less, more preferably 30 mol % or less. The amount (u) of the structural unit represented by the formula (1c) is 0 mol % or greater, preferably 10 mol % or greater, more preferably 20 mol % or greater and is preferably 50 mol % or less, more preferably 30 mol % or less. When the amounts of the structural units in the formulas (1a) to (1c) are within the ranges, the photocurable adhesive can further prevent a rise in adhesion or the generation of adhesive deposits upon separation.

The structural unit represented by the formula (1a), the structural unit represented by the formula (1b), and the structural unit represented by the formula (1c) may have a block structure including block components in which the structural units are each arranged in series or a random structure in which the structural units are randomly arranged.

The method for producing the resin (1-I) containing a double bond-containing functional group and having an imide skeleton in a backbone repeating unit is not limited. For example, the resin (1-I) can be obtained by reacting a diamine compound and an aromatic acid anhydride to prepare an imide compound and reacting a functional group in the imide compound with a compound containing a functional group reactive with the functional group of the imide compound and a double bond-containing functional group (hereinafter referred to as a functional group-containing unsaturated compound). Alternatively, for example, the resin (1-I) can also be obtained by reacting a diamine compound and an aromatic acid anhydride to prepare an imide compound and reacting an end of the imide compound with, for example, maleic anhydride.

The diamine compound used may be an aliphatic diamine compound or an aromatic diamine compound.

Using an aliphatic diamine compound as the diamine compound allows the photocurable adhesive to have high light transmission, and allows the photocurable adhesive layer containing the photocurable adhesive to exhibit high flexibility and thus to exhibit high conformability to adherends with irregularities and be more easily separated upon separation. Using an aromatic diamine compound as the diamine compound further improves the heat resistance of the photocurable adhesive. Using a diamine compound containing a functional group as the diamine compound and reacting this functional group with the above functional group-containing unsaturated compound can produce a resin (1-I) containing a double bond-containing functional group in a side chain.

These aliphatic diamine compounds, aromatic diamine compounds, and diamine compounds containing a functional group may be used alone or in combination of two or more thereof.

Examples of the aliphatic diamine compound include 1,10-diaminodecane, 1,12-diaminododecane, dimer diamine, 1,2-diamino-2-methylpropane, 1,2-diaminocyclohexane, 1,2-diaminopropane, 1,3-diaminopropane, 1,4-diaminobutane, 1,5-diaminopentane, 1,7-diaminoheptane, 1,8-diaminomentane, 1,8-diaminooctane, 1,9-diaminononane, 3,3'-diamino-N-methyldipropylamine, diaminomaleonitrile, 1,3-diaminopentane, bis(4-amino-3-methylcyclohexyl)methane, 1,2-bis(2-aminoethoxy)ethane, and 3(4),8(9)-bis(aminomethyl)tricyclo(5.2.1.02,6)decane.

Examples of the aromatic diamine compound include 9,10-diaminophenanthrene, 4,4'-diaminooctafluorobiphenyl, 3,7-diamino-2-methoxyfluorene, 4,4'-diaminobenzophenone, 3,4-diaminobenzophenone, 3,4-diaminotoluene, 2,6-diaminoanthraquinone, 2,6-diaminotoluene, 2,3-diaminotoluene, 1,8-diaminonaphthalene, 2,4-diaminotoluene, 2,5-diaminotoluene, 1,4-diaminoanthraquinone, 1,5-diaminoanthraquinone, 1,5-diaminonaphthalene, 1,2-diaminoanthraquinone, 2,4-cumenediamine, 1,3-bisaminomethylbenzene, 1,3-bisaminomethylcyclohexane, 2-chloro-1,4-diaminobenzene, 1,4-diamino-2,5-dichlorobenzene, 1,4-diamino-2,5-dimethylbenzene, 4,4'-diamino-2,2'-bistrifluoromethylbiphenyl, bis(amino-3-chlorophenyl) ethane, bis(4-amino-3,5-dimethylphenyl)methane, bis(4-amino-3,5-diethylphenyl)methane, bis(4-amino-3-ethyldiamino)fluorene, 2,3-diaminonaphthalene, 2,3-diaminophenol, -5-methylphenyl)methane, bis(4-amino-3-methylphenyl)methane, bis(4-amino-3-ethylphenyl) methane, 4,4'-diaminophenylsulfone, 3,3'-diaminophenylsulfone, 2,2-bis(4, (4-aminophenoxy)phenyl) sulfone, 2,2-bis(4-(3-aminophenoxy)phenyl)sulfone, 4,4'-oxydianiline, 4,4'-diaminodiphenylsulfide, 3,4'-oxydianiline, 2,2-bis(4-(4-aminophenoxy)phenyl)propane, 1,3-bis(4-aminophenoxy)benzene, 4,4'-bis(4-aminophenoxy)biphenyl, 4,4'-diamino-3,3'-dihydroxybiphenyl, 4,4'-diamino-3,3'-dimethylbiphenyl, 4,4'-diamino-3,3'-dimethoxybiphenyl, Bisaniline M, Bisaniline P, 9,9-bis(4-aminophenyl)fluorene, o-tolidine sulfone, methylene bis (anthranilic acid), 1,3-bis(4-aminophenoxy)-2,2-dimethylpropane, 1,3-bis(4-aminophenoxy)propane, 1,4-bis (4-aminophenoxy)butane, 1,5-bis(4-aminophenoxy)butane, 2,3,5,6-tetramethyl-1,4-phenylene diamine, 3,3',5,5'-tetramethylbenzidine, 4,4'-diaminobenzanilide, 2,2-bis(4-aminophenyl)hexafluoropropane, polyoxyalkylene diamines (e.g., Jeffamine D-230, D400, D-2000, and D-4000 produced by Huntsman), 1,3-cyclohexane bis(methylamine), m-xylylenediamine, and p-xylylenediamine.

Of the aliphatic diamine compounds, dimer diamines are preferred to achieve higher light transmission and higher flexibility and to allow the resin (1-I) containing a double bond-containing functional group and having an imide skeleton in a backbone repeating unit to have higher compatibility with solvents and other components to facilitate the formation of a photocurable adhesive layer.

The dimer diamine is a diamine compound obtainable by reducing and aminating cyclic or acyclic dimer acid obtained as a dimer of an unsaturated fatty acid, and examples thereof include linear, monocyclic, and polycyclic dimer diamines. The dimer diamine may contain a carbon-carbon unsaturated double bond and may be a hydrogenated product obtained by adding hydrogen. Specific examples of the dimer diamine include a dimer diamine capable of constituting the group represented by the formula (4-1), the group represented by the formula (4-2), the group represented by the formula (4-3), and the group represented by the formula (4-4) above.

Examples of the diamine compound containing a functional group include diamine compounds containing hydroxy groups, diamine compounds containing carboxy groups, and diamine compounds containing halogen groups.

Examples of the diamine compounds containing hydroxy groups include 1,3-diamino-2-propanol, 2,4-diaminophenoxyethanol, 3,5-diaminophenoxyethanol, 2,4-diaminophenol, 3,5-diaminophenol, 2,4-diaminobenzyl alcohol, 4,6-diaminoresorsin dihydrochloride, and 2,2-bis(3-amino-4-hydroxyphenyl)hexafluoropropane. Examples of the diamine compounds containing carboxy groups include 3,5-diaminobenzoic acid. Examples of the diamine compounds containing halogen groups include 2,4-diaminochlorobenzene.

Examples of the aromatic acid anhydride include pyromellitic acid, 1,2,5,6-naphthalenetetracarboxylic acid, 2,3,6,7-naphthalenetetracarboxylic acid, 1,2,4,5-naphthalenetetracarboxylic acid, 1,4,5,8-naphthalenetetracarboxylic acid, 3,3',4,4'-benzophenonetetracarboxylic acid, 3,3',4,4'-biphenylethertetracarboxylic acid, 3,3',4,4'-biphenyltetracarboxylic acid, 2,3,5,6-pyridinetetracarboxylic acid, 3,4,9,10-perylenetetracarboxylic acid, 4,4'-sulfonyldiphthalic acid, 1-trifluoromethyl-2,3,5,6-benzenetetracarboxylic acid, 2,2',3,3'-biphenyltetracarboxylic acid, 2,2-bis(3,4-dicarboxyphenyl)propane, 2,2-bis(2,3-dicarboxyphenyl)propane, 1,1-bis(2,3-dicarboxyphenyl)ethane, 1,1-bis(3,4-dicarboxyphenyl)ethane, bis(2,3-dicarboxyphenyl)methane, bis(3,4-dicarboxyphenyl)methane, bis(3,4-dicarboxyphenyl)sulfone, bis(3,4-dicarboxyphenyl)ether, benzene-1,2,3,4-tetracarboxylic acid, 2,3,2',3'-benzophenonetetracarboxylic acid, 2,3,3',4'-benzophenonetetracarboxylic acid, phenanthrene-1,8,9,10-tetracarboxylic acid, pyrazine-2,3,5,6-tetracarboxylic acid, thiophene-2,3,4,5-tetracarboxylic acid, 2,3,3',4'-biphenyltetracarboxylic acid, 3,4,3',4'-biphenyltetracarboxylic acid, 2,3,2',3'-biphenyltetracarboxylic acid, 4,4'-bis(3,4-dicarboxyphenoxy)diphenyl sulfide, and 4,4'-(4,4'-isopropylidenediphenoxy)-bis(phthalic acid).

The functional group-containing unsaturated compound to be used is selected in accordance with the functional group at an end or in a side chain of the imide compound.

For example, in the case where the functional group at an end or in a side chain of the imide compound is a hydroxy group, a carboxy group-containing maleimide compound may be used. Examples of the carboxy group-containing maleimide compound include maleimidoacetic acid, maleimidopropionic acid, maleimidobutyric acid, maleimidohexanoic acid, trans-4-(N-maleimidomethyl)cyclohexane-1-carboxylic acid, and 19-maleimido-17-oxo-4,7,10,13-tetraoxa-16-azanonadecanoic acid. Examples also include ether group-containing vinyl compounds such as butyl vinyl ether, glycidyl group-containing allyl compounds such as diallyl monoglycidyl isocyanurate, and glycidyl group-containing allyl ether compounds such as allyl glycidyl ether, and glycerol diallylmonoglycidyl ether. Examples further include glycidyl group-containing vinyl ether compounds such as glycidyl oxyethyl vinyl ether, glycidyl oxybutyl vinyl ether, glycidyl oxyhexyl vinyl ether, glycidyl diethylene glycol vinyl ether, and glycidyl cyclohexane dimethanol monovinyl ether. Examples still further include isocyanate group-containing allyl compounds such as allyl isocyanate and isocyanate group-containing (meth)acryloyl compounds such as 2-(meth)acryloyloxy ethyl isocyanate.

In the case where the functional group at an end or in a side chain of the imide compound is a carboxy group, for example, examples include hydroxy group-containing allyl compounds such as trimethylolpropane diallyl ether and pentaerythritol triallyl ether, and glycidyl group-containing allyl compounds such as diallyl monoglycidyl isocyanurate. Examples also include glycidyl group-containing allyl ether compounds such as allyl glycidyl ether, and glycerol diallyl monoglycidyl ether. Examples further include glycidyl group-containing vinyl ether compounds such as glycidyl oxyethyl vinyl ether, glycidyl oxybutyl vinyl ether, glycidyl oxyhexyl vinyl ether, glycidyl diethylene glycol vinyl ether, and glycidyl cyclohexane dimethanol monovinyl ether.

When the reactive resin contains the resin (1-I) containing a double bond-containing functional group and having an imide skeleton in a backbone repeating unit, the amount of the resin (1-I) is not limited. The lower limit of the amount thereof in 100 parts by weight of the reactive resin is preferably 10 parts by weight, and the upper limit thereof is 100 parts by weight. When the amount of the resin (1-I) containing a double bond-containing functional group and having an imide skeleton in a backbone repeating unit is within this range, the photocurable adhesive can be more easily separated upon separation. For higher separability, the lower limit of the amount of the resin (1-I) containing a double bond-containing functional group and having an imide skeleton in a backbone repeating unit is more preferably 20 parts by weight, still more preferably 30 parts by weight, and the upper limit thereof is more preferably 90 parts by weight, still more preferably 80 parts by weight, further preferably 70 parts by weight.

The resin (1-II) not containing a double bond-containing functional group and having an imide skeleton in a backbone repeating unit preferably has a weight average molecular weight (Mw) of 20,000 or greater. When the weight average molecular weight is 20,000 or greater, the photocurable adhesive can exhibit higher heat resistance. In other words, the photocurable adhesive can further prevent a rise in adhesion or the generation of adhesive deposits upon separation even when high-temperature processing at 300° C. or higher is performed. The weight average molecular weight is more preferably 50,000 or greater. The upper limit of the weight average molecular weight is not limited. From the standpoint of the solubility in solvents, the upper limit is preferably 600,000, more preferably 300,000.

The weight average molecular weight can be measured in the same manner as for the resin (1-I) containing a double bond-containing functional group and having an imide skeleton in a backbone repeating unit.

Specific examples of the resin (1-II) not containing a double bond-containing functional group and having an imide skeleton in a backbone repeating unit include a resin (1-ii) containing a structural unit represented by the following formula (1d) and a structural unit represented by the following formula (1e) and having ends represented by $X^4$ and $X^5$.

[Chem. 3]

(1d)

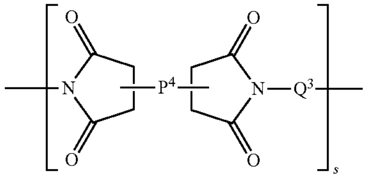

(1e)

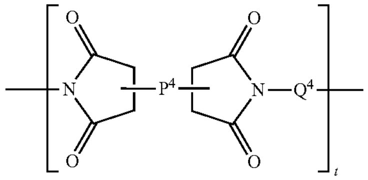

In the formulas (1d) and (1e), $s>0$ and $t\geq 0$ are satisfied; $P^4$ and $P^5$ each independently represent an aromatic group; $Q^3$ represents a substituted or unsubstituted linear, branched, or cyclic aliphatic group; $Q^4$ represents a substituted or unsubstituted aromatic structure-containing group; and $X^4$ and $X^5$ represents functional groups not containing a double bond.

In the formulas (1d) and (1e), $P^4$ and $P^5$ are preferably C5-C50 aromatic groups. When $P^4$ and $P^5$ are C5-C50 aromatic groups, the photocurable adhesive can exhibit higher heat resistance. In other words, the photocurable adhesive can further prevent a rise in adhesion or the generation of adhesive deposits upon separation even when high-temperature processing at 300° C. or higher is performed.

In the formula (1d), $Q^3$ is preferably a substituted or unsubstituted linear, branched, or cyclic C2-C100 aliphatic group. When $Q^3$ is a substituted or unsubstituted linear, branched, or cyclic C2-C100 aliphatic group, the photocurable adhesive can have high light transmission. Moreover, the photocurable adhesive layer containing the photocurable adhesive can have high flexibility, and thus can exhibit high conformability to adherends with irregularities and be more easily separated upon separation.

$Q^3$ is also preferably an aliphatic group derived from a diamine compound. In particular, $Q^3$ is preferably an aliphatic group derived from a dimer diamine to achieve higher light transmission and higher flexibility and to allow the resin (1-II) not containing a double bond-containing functional group and having an imide skeleton in a backbone repeating unit to have higher compatibility with solvents and other components to facilitate the formation of a photocurable adhesive from the photocurable adhesive.

In other words, in the temporary fixing material of the present invention, at least one of the resin (1-I) containing a double bond-containing functional group and having an imide skeleton in a backbone repeating unit or the resin (1-II) not containing a double bond-containing functional group and having an imide skeleton in a backbone repeating unit preferably contains an aliphatic group derived from a dimer diamine. In other words, the resin (1) having an imide skeleton in a backbone repeating unit preferably contains an aliphatic group derived from a dimer diamine.

In the formula (1e), $Q^4$ is preferably a substituted or unsubstituted C5-C50 aromatic structure-containing group. When $Q^4$ is a substituted or unsubstituted C5-C50 aromatic structure-containing group, the photocurable adhesive can exhibit higher heat resistance. In other words, the photocurable adhesive can further prevent a rise in adhesion or the generation of adhesive deposits upon separation even when high-temperature processing at 300° C. or higher is performed.

Examples of the functional groups not containing a double bond represented by $X^4$ and $X^5$ include each independently aliphatic groups, alicyclic groups, aromatic groups, acid anhydrides, and amine compounds. Specific examples include a one-end-unreacted product of an acid anhydride that is a raw material of the resin (1-II) not containing a double bond-containing functional group and having an imide skeleton in a backbone repeating unit and a one-end-unreacted product of a diamine compound that is a raw material of the resin (1-II).

In the formulas (1d) and (1e), s and t respectively correspond to the amounts (mol %) of the structural unit represented by the formula (1d) and the structural unit represented by the formula (1e) in the resin (1-II) not containing a double bond-containing functional group and having an imide skeleton in a backbone repeating unit.

The amount (s) of the structural unit represented by the formula (1d) is greater than 0 mol %, preferably 30 mol % or greater, more preferably 50 mol % or greater and is preferably 90 mol % or less, more preferably 80 mol % or less. The amount (t) of the structural unit represented by the formula (1e) is 0 mol % or greater, preferably 5 mol % or greater, more preferably 10 mol % or greater, still more preferably 20 mol % or greater and is preferably 50 mol % or less, more preferably 30 mol % or less. When the amounts of the structural units in the formulas (1d) and (1e) are within the ranges, the photocurable adhesive can further prevent a rise in adhesion or the generation of adhesive deposits upon separation.

The structural unit represented by the formula (1d) and the structural unit represented by the formula (1e) may have a block structure including block components in which the structural units are each arranged in series or a random structure in which the structural units are randomly arranged.

The method for producing the resin (1-II) not containing a double bond-containing functional group and having an imide skeleton in a backbone repeating unit is not limited. For example, the resin (1-II) can be produced by reacting a diamine compound and an aromatic acid anhydride. The diamine compound and the aromatic acid anhydride may be the same as the above diamine compound and aromatic acid anhydride for the resin (1-I) containing a double bond-containing functional group and having an imide skeleton in a backbone repeating unit.

When the reactive resin contains the resin (1-II) not containing a double bond-containing functional group and having an imide skeleton in a backbone repeating unit, the amount of the resin (1-II) is not limited. The lower limit of the amount thereof in 100 parts by weight of the reactive resin is preferably 10 parts by weight, and the upper limit thereof is preferably 90 parts by weight. When the amount of the resin (1-II) not containing a double bond-containing functional group and having an imide skeleton in a backbone repeating unit is within this range, the photocurable adhesive can be more easily separated upon separation. For higher separability, the lower limit of the amount of the resin (1-II) not containing a double bond-containing functional group and having an imide skeleton in a backbone repeating unit is more preferably 20 parts by weight, and the upper limit thereof is more preferably 80 parts by weight.

The reactive resin preferably further contains a polyfunctional monomer or polyfunctional oligomer (2) containing two or more double bond-containing functional groups in the molecule and having a molecular weight of 5,000 or less (hereafter, also simply referred to as a "polyfunctional monomer or polyfunctional oligomer (2)").

The reactive resin containing such a polyfunctional monomer or polyfunctional oligomer (2) allows the photocurable adhesive to be more efficiently three-dimensionally reticulated by irradiation with light, thus further preventing a rise in adhesion or the generation of adhesive deposits upon separation.

As described above, when the resin (1) having an imide skeleton in a backbone repeating unit itself has no reactivity, the reactive resin needs to contain a different component containing a reactive functional group so that the reactive resin as a whole has reactivity. Preferably, the polyfunctional monomer or polyfunctional oligomer (2) is used as such a different component containing a reactive functional group. An exemplary case where the resin (1) having an imide skeleton in a backbone repeating unit itself has no reactivity is a case where the resin (1) having an imide skeleton in a backbone repeating unit contains only the resin (1-II) not containing a double bond-containing functional group and having an imide skeleton in a backbone repeating unit.

Examples of the double bond-containing functional group in the polyfunctional monomer or polyfunctional oligomer (2) include an optionally substituted maleimide group, an optionally substituted citraconimide group, an optionally substituted vinyl ether group, an optionally substituted allyl group, and an optionally substituted (meth)acrylic group. For higher heat resistance, an optionally substituted maleimide group is favorable among these.

The polyfunctional monomer or polyfunctional oligomer (2) preferably contains an aliphatic group derived from a diamine compound. The diamine compound may be an aliphatic diamine compound or an aromatic diamine compound, but is preferably an aliphatic diamine compound. Using an aliphatic diamine compound as the diamine compound allows the photocurable adhesive to have high light transmission, and also allows the photocurable adhesive layer containing the photocurable adhesive to exhibit high flexibility, and thus to exhibit high conformability to adherends with irregularities and be more easily separated upon separation.

Of the aliphatic diamine compounds, the dimer diamines described above are preferred to achieve higher light transmission and higher flexibility and to allow the polyfunctional monomer or polyfunctional oligomer (2) to have higher compatibility with solvents and other components to facilitate the formation of a photocurable adhesive layer.

The amount of the polyfunctional monomer or polyfunctional oligomer (2) is not limited. The lower limit of the amount thereof in 100 parts by weight of the reactive resin is preferably 5 parts by weight, and the upper limit thereof is preferably 100 parts by weight. When the amount of the polyfunctional monomer or polyfunctional oligomer (2) is within this range, the photocurable adhesive can be more easily separated upon separation. For higher separability, the lower limit of the amount of the polyfunctional monomer or polyfunctional oligomer (2) is more preferably 10 parts by weight, and the upper limit thereof is more preferably 50 parts by weight.

When the reactive resin contains the resin (1-I) containing a double bond-containing functional group and having an imide skeleton in a backbone repeating unit and the polyfunctional monomer or polyfunctional oligomer (2), the amounts thereof are not limited. The lower limit of the total amount thereof in 100 parts by weight of the reactive resin is preferably 20 parts by weight, and the upper limit thereof is preferably 80 parts by weight. When the total amount of the resin (1-I) and the polyfunctional monomer or polyfunctional oligomer (2) is within this range, the photocurable adhesive can be more easily separated upon separation. For higher separability, the lower limit of the total amount of the resin (1-I) and the polyfunctional monomer or polyfunctional oligomer (2) is more preferably 30 parts by weight, still more preferably 40 parts by weight, further preferably 50 parts by weight, and the upper limit thereof is more preferably 70 parts by weight.

The photocurable adhesive needs only to contain the reactive resin, but preferably further contains a silicone compound or a fluorine compound.

As silicone and fluorine compounds have excellent heat resistance, the photocurable adhesive is not likely to burn even after high-temperature processing at 300° C. or higher. Moreover, upon separation, the silicone or fluorine compound bleeds out to the interface with the adherend to further facilitate separation.

The silicone compound is not limited, and examples thereof include silicone oil, silicone diacrylate, and silicone-based graft copolymers. The fluorine compound is not limited, and examples thereof include fluorine atom-containing hydrocarbon compounds.

The silicone compound or fluorine compound preferably contains a functional group capable of crosslinking with the reactive resin.

The silicone compound or fluorine compound containing a functional group capable of crosslinking with the reactive resin chemically reacts with and is incorporated into the reactive resin when irradiated with light or when reacting with a crosslinking agent or the like. The silicone compound or fluorine compound are thus less likely to attach to the adherend, thereby reducing contamination. The functional group capable of crosslinking with the reactive resin is not limited. Examples thereof include a carboxy group, a radically polymerizable unsaturated bond (e.g., a vinyl group, a (meth)acryloyl group, an optionally substituted maleimide group), a hydroxy group, an amide group, an isocyanate group, and an epoxy group.

In particular, a silicone compound containing a functional group capable of crosslinking with the reactive resin is favorable as it is environment-friendly and easily disposable.

The silicone compound containing a functional group capable of crosslinking with the reactive resin is preferably a silicone compound having a siloxane skeleton in the backbone and containing a double bond-containing functional group in a side chain or at an end.

The silicone compound having a siloxane skeleton in the backbone and a double bond-containing functional group in a side chain or at an end is not limited but preferably contains at least one selected from the group consisting of a silicone compound represented by the following formula (I), a silicone compound represented by the following formula (II), and a silicone compound represented by the following formula (III). These silicone compounds have particularly high heat resistance and high polarity and therefore easily bleed out from the photocurable adhesive.

[Chem. 4]

(I)

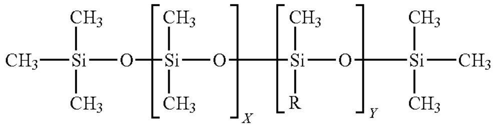

(II)

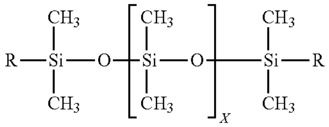

(III)

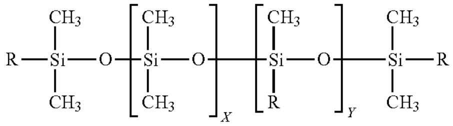

In the formulas (I), (II), and (III), X and Y each independently represent an integer of 0 to 1,200 and R represents a double bond-containing functional group.

Examples of the double bond-containing functional group for R in the formulas (I), (II), and (III) include an optionally substituted maleimide group, an optionally substituted citraconimide group, an optionally substituted vinyl ether group, an optionally substituted allyl group, and an optionally substituted (meth)acrylic group. For higher heat resistance, an optionally substituted maleimide group is favorable. In the case where multiple R's are present in the formulas (I), (II), and (III), the R's may be the same or different from each other.

Exemplary commercial products of the silicone compound represented by the formula (I), (II), or (III) include EBECRYL 350 and EBECRYL 1360 (both produced by Daicel-Cytec Co., Ltd.). Also included are BYK-UV3500 (produced by BYK-Chemie) and TEGO RAD2250 (produced by Evonik) (in these products, R represents an acrylic group).

The amount of the silicone compound or fluorine compound is not limited. The lower limit of the amount thereof relative to 100 parts by weight of the reactive resin is preferably 0.1 parts by weight, and the upper limit thereof is preferably 20 parts by weight. When the amount of the silicone compound or fluorine compound is within this range, the photocurable adhesive can exhibit excellent separability without contaminating the adherend. For achieving still higher separability while reducing contamination, the lower limit of the amount of the silicone compound or fluorine compound is more preferably 0.3 parts by weight, and the upper limit thereof is more preferably 10 parts by weight.

As the photocurable adhesive of the present invention has excellent heat resistance, a sufficient effect can be obtained even when the amount of the silicone compound or fluorine compound is relatively small. Accordingly, the possibility of contamination by the silicone compound or fluorine compound can be further lowered.

The photocurable adhesive may further contain an inorganic filler.

When containing the inorganic filler, the photocurable adhesive can further reduce detachment even during high-temperature processing at 300° C. or higher because the inorganic filler can reduce a decrease in the modulus of elasticity at high temperature.

The inorganic filler is not limited. The inorganic filler may be, for example, an inorganic filler formed of at least one selected from the group consisting of oxides of silicon, titanium, aluminum, calcium, boron, magnesium, and zirconia, and composites of these. Preferred among these are silica and talc, which are commercial products and inexpensively and easily available.

The inorganic filler may be surface-modified. Any modifying functional group may be used to surface-modify the inorganic filler. Examples thereof include an alkylsilane group, a methacryloyl group, and a dimethylsiloxane group. Preferred among these is a dimethylsiloxane group, which has appropriate hydrophobicity.

The average particle size of the inorganic filler is not limited. The lower limit thereof is preferably 5 nm, and the upper limit thereof is preferably 30 μm. When the average particle size of the inorganic filler is within this range, the photocurable adhesive can further reduce detachment during high-temperature processing and be separated by peel treatment upon separation. The lower limit of the average particle size of the inorganic filler is more preferably 10 nm, and the upper limit thereof is more preferably 20 μm. The lower limit is still more preferably 15 nm, and the upper limit is still more preferably 15 μm.

The average particle size is preferably a number average particle size. The average particle size can be measured by, for example, observing 50 random inorganic filler particles with an electron microscope or an optical microscope and calculating the average of the particle sizes of the inorganic filler particles, or by performing laser diffraction particle size distribution measurement.

The amount of the inorganic filler is not limited. The lower limit of the amount thereof relative to 100 parts by weight of the reactive resin is preferably 1 part by weight, and the upper limit thereof is preferably 20 parts by weight. When the amount of the inorganic filler is within this range, the photocurable adhesive can further reduce detachment during high-temperature processing and be separated by peel treatment upon separation. The lower limit of the amount of the inorganic filler is more preferably 3 parts by weight, and the upper limit thereof is more preferably 15 parts by weight. The lower limit is still more preferably 5 parts by weight, and the upper limit is still more preferably 10 parts by weight.

The photocurable adhesive preferably further contains a photopolymerization initiator.

The photopolymerization initiator used is, for example, activated by irradiation with light at a wavelength of 250 to 800 nm. In particular, the photopolymerization initiator preferably contains a photopolymerization initiator having a molar absorption coefficient at 405 nm of 1 or greater, because such a photopolymerization initiator is less likely to overlap in absorption wavelength with the reactive resin, and is sufficiently activated when the temporary fixing material is irradiated with light. The photopolymerization initiator more preferably contains a photopolymerization initiator having a molar absorption coefficient at 405 nm of 200 or greater, still more preferably a photopolymerization initiator having a molar absorption coefficient at 405 nm of 350 or greater. The upper limit of the molar absorption coefficient at 405 nm of the photopolymerization initiator having a molar absorption coefficient at 405 nm of 1 or greater is not limited, but may be 2,000 or 1,500, for example.

Examples of the photopolymerization initiator include acetophenone derivative compounds such as methoxyacetopohenone, benzoin ether compounds such as benzoin propyl ether and benzoin isobutyl ether, ketal derivative compounds such as benzyl dimethyl ketal and acetophenone diethyl ketal, and phosphine oxide derivative compounds. Examples further include photoradical polymerization initiators such as bis(η5-cyclopentadienyl)titanocene derivative compounds, benzophenone, Michler's ketone, chlorothioxanthone, dodecylthioxanthone, dimethylthioxanthone, diethylthioxanthone, α-hydroxycyclohexyl phenyl ketone, and 2-hydroxymethyl phenyl propane. These photopolymerization initiators may be used alone or in combination of two or more thereof.

The amount of the photopolymerization initiator is not limited. The lower limit of the amount thereof relative to 100 parts by weight of the reactive resin is preferably 0.1 parts by weight, and the upper limit thereof is preferably 10 parts by weight. When the amount of the photopolymerization initiator is within this range, the photocurable adhesive as a whole can uniformly and quickly polymerize and crosslink when irradiated with light. The resulting increase in the modulus of elasticity greatly decreases adhesion, preventing a rise in adhesion or the generation of adhesive deposits upon separation. The lower limit of the amount of the polymerization initiator is more preferably 0.3 parts by weight, and the upper limit thereof is more preferably 3 parts by weight.

The photocurable adhesive may further contain a gas generating agent that generates gas when irradiated with light. The photocurable adhesive containing the gas generating agent generates gas when irradiated with light to discharge the gas to the interface with the adherend. Thus, the adherend can be more easily separated without adhesive deposits even after high-temperature processing at 300° C. or higher. In addition, even a thin adherend can be separated without damage thereto after high-temperature processing at 300° C. or higher.

The gas generating agent preferably has a weight loss rate at 300° C. of 5% or less when heated from 30° C. to 300° C. at a heating rate of 10° C./min in a nitrogen atmosphere in thermogravimetry-differential thermal analysis (TG-DTA) measurement. When the weight loss rate is 5% or less, the gas generating agent is less likely to decompose even in high-temperature processing at 300° C. or higher, and the photocurable adhesive can exhibit higher heat resistance. In other words, the photocurable adhesive can further reduce detachment during high-temperature processing and can further prevent a rise in adhesion or the generation of adhesive deposits upon separation.

The thermogravimetry-differential thermal analysis (TG-DTA) measurement can be performed using, for example, a TG-DTA device (STA7200RV, produced by Hitachi High-Tech Science Corporation, or its equivalent product).

Examples of the gas generating agent include gas generating agents that generate gas when heated and gas generating agents that generate gas when irradiated with light. These gas generating agents may be used alone or in combination of two or more thereof. Among these, gas generating agents that generate gas when irradiated with light are preferred, and gas generating agents that generate gas when irradiated with UV light are more preferred.

Examples of the gas generating agent that generates gas when irradiated with light include tetrazole compounds or salts thereof, triazole compounds or salts thereof, azo compounds, azide compounds, xanthone acetic acid, and carbonates. These gas generating agents may be used alone or in combination of two or more thereof. Among these, tetrazole compounds or salts thereof are favorable for their particularly high heat resistance.

The amount of the gas generating agent is not limited. The lower limit of the amount thereof relative to 100 parts by weight of the reactive resin is preferably 5 parts by weight. The upper limit thereof is preferably 50 parts by weight. When the amount of the gas generating agent is within this range, the photocurable adhesive can exhibit particularly excellent separability. The lower limit of the amount of the gas generating agent is more preferably 8 parts by weight, and the upper limit thereof is more preferably 30 parts by weight.

The photocurable adhesive may contain, for example, known additives such as photosensitizers, thermal stabilizers, antioxidants, antistatic agents, plasticizers, resins, surfactants, and waxes.

The photocurable adhesive of the present invention may be produced by any method. For example, it can be produced by mixing the reactive resin containing the resin (1) having an imide skeleton in a backbone repeating unit and optional additives using a device such as a bead mill, an ultrasonic disperser, a homogenizer, a high-power disperser, or a roll mill.

As described above, the temporary fixing material of the present invention is not limited as long as it contains the photocurable adhesive. It may be a liquid temporary fixing adhesive or a temporary fixing adhesive sheet including the photocurable adhesive layer containing the photocurable adhesive.

The lower limit of the gel fraction of the photocurable adhesive layer containing the photocurable adhesive after being cured is preferably 20% by weight, and the upper limit thereof is preferably 99% by weight. When the gel fraction after curing is within the range, the photocurable adhesive layer can be more easily separated upon separation. The lower limit of the gel fraction after curing is more preferably 40% by weight, still more preferably 60% by weight, further preferably 80% by weight, and the upper limit thereof is more preferably 95% by weight.

The gel fraction after curing is measured by the following method after irradiating the photocurable adhesive layer with 1,000 mJ/cm$^2$ of UV light at 405 nm at an irradiation intensity of 70 mW/cm$^2$.

The photocurable adhesive layer is cut into a flat rectangular specimen having a size of 50 mm×100 mm. The specimen is immersed in toluene at 23° C. for 24 hours, then taken out of the toluene, and dried at 110° C. for one hour. The weight of the dried specimen is measured, and the gel fraction is calculated using the following equation (1). No release film to protect the photocurable adhesive layer is stacked on the specimen.

$$\text{Gel fraction (\% by weight)}=100\times(W_2-W_0)/(W_1-W_0) \quad (1)$$

($W_0$: the weight of the substrate, $W_1$: the weight of the specimen before immersion, $W_2$: the weight of the specimen after immersion and drying)

The photocurable adhesive layer containing the photocurable adhesive preferably has a modulus of elasticity at 25° C. of 1×10$^7$ Pa or greater after being cured.

When the modulus of elasticity at 25° C. after curing is within the range, the temporary fixing material is less likely to break when separated from the adherend. This can further reduce adhesive deposits. The modulus of elasticity at 25° C. after curing is more preferably 5×10$^7$ Pa or greater, still more preferably 1×10$^8$ Pa or greater. The upper limit of the modulus of elasticity at 25° C. after curing is not limited. From the standpoint of adhesion, the modulus of elasticity is preferably 1×10$^{10}$ Pa or less.

The photocurable adhesive layer containing the photocurable adhesive preferably has a modulus of elasticity at 300° C. of 1×10$^5$ Pa or greater after being cured.

When the modulus of elasticity at 300° C. after curing is within the range, the adhesion is less likely to increase during heating of the temporary fixing material.

The modulus of elasticity at 300° C. after curing is more preferably 5×10$^5$ Pa or greater, still more preferably 1×10$^6$ Pa or greater. The upper limit of the modulus of elasticity at 300° C. after curing is not limited. From the standpoint of adhesion, the modulus of elasticity is preferably 1×10$^8$ Pa or less, more preferably 1×10$^7$ Pa or less.

The modulus of elasticity at 25° C. after curing and the modulus of elasticity at 300° C. after curing can be measured by the following method.

A specimen having a size of 5 mm×35 mm×thickness 0.03 mm is prepared from the photocurable adhesive layer. The obtained specimen is cured. The cured sample is immersed in liquid nitrogen and cooled to −50° C. The sample is then heated to 300° C. using a viscoelastic spectrometer (e.g., DVA-200, produced by IT Measurement Co., Ltd.) under the conditions of a constant-rate heating tensile mode, a heating rate of 10° C./min, and a frequency of 10 Hz, and the storage modulus of elasticity is measured. From the obtained results of the storage modulus of elasticity, the modulus of elasticity at 25° C. after curing and the modulus of elasticity at 300° C. after curing are determined.

The photocurable adhesive layer is cured by irradiation with 1,000 mJ/cm$^2$ of UV light at 405 nm at an irradiation intensity of 70 mW/cm$^2$.

The thickness of the photocurable adhesive layer containing the photocurable adhesive is not limited. The lower limit thereof is preferably 5 μm, and the upper limit thereof is preferably 550 μm. When the thickness is 5 μm or greater, the photocurable adhesive layer can have sufficient initial adhesion. When the thickness is 550 μm or less, the photocurable adhesive layer can have high light transmission and also can exhibit high flexibility, and thus can exhibit high conformability to adherends with irregularities and be more easily separated upon separation. The lower limit of the thickness is more preferably 10 μm, and the upper limit thereof is more preferably 400 μm. The lower limit is still more preferably 20 μm, and the upper limit is still more preferably 300 μm. The lower limit is further preferably 30 μm, and the upper limit is further preferably 200 μm, even further preferably 150 μm.

The temporary fixing material of the present invention is more preferably a temporary fixing sheet including the photocurable adhesive layer containing the photocurable adhesive. In this case, the temporary fixing material of the present invention may include the photocurable adhesive layer(s) on one or both surfaces of a substrate, or may not include a substrate. The absence of the substrate eliminates the need for selecting a substrate having both light transmission and heat resistance, leading to a less expensive, simply structured temporary fixing material.

When the temporary fixing material includes the substrate, examples of the substrate include sheets of resins such as acrylic, olefin, polycarbonate, vinyl chloride, ABS, polyethylene terephthalate (PET), polyethylene naphthalate (PEN), nylon, urethane, polyimide, polyetheretherketone (PEEK), and polyamide (PA). The substrate used may suitably be a sheet having high light transmission. The substrate may be a sheet having a mesh-like structure, a perforated sheet, or glass.

The thickness of the substrate is not limited. For higher light transmission and higher flexibility, the lower limit of the thickness is preferably 5 μm, and the upper limit thereof is preferably 150 μm. The lower limit is more preferably 10 μm, and the upper limit is more preferably 100 μm.

When the photocurable adhesive contains the gas generating agent, the temporary fixing material of the present invention preferably includes a first photocurable adhesive layer containing the photocurable adhesive and a second adhesive layer.

The first photocurable adhesive layer contains the gas generating agent and is a curable adhesive layer capable of generating gas.

When including the first photocurable adhesive layer and the second adhesive layer, the temporary fixing material of the present invention may further include the substrate, and the first photocurable adhesive layer and the second adhesive layer may be stacked on one surface and an opposite surface of the substrate, respectively.

The lower limit of the gel fraction of the first photocurable adhesive layer after being cured is preferably 50% by weight. When the gel fraction after curing is within the range, the first photocurable adhesive layer can be more easily separated upon separation. The lower limit of the gel fraction after curing is more preferably 80% by weight.

The gel fraction after curing is measured by the following method after curing the first photocurable adhesive layer by irradiation with 1,000 mJ/cm$^2$ of UV light at 405 nm at an irradiation intensity of 70 mW/cm$^2$.

The first photocurable adhesive layer is cut into a flat rectangular specimen having a size of 50 mm×100 mm. The specimen is immersed in toluene at 23° C. for 24 hours, then taken out of the toluene, and dried at 110° C. for one hour. The weight of the dried specimen is measured, and the gel fraction is calculated using the following equation (1). No release film to protect the first photocurable adhesive layer is stacked on the specimen.

$$\text{Gel fraction (\% by weight)}=100\times(W_2-W_0)/(W_1-W_0) \quad (1)$$

($W_0$: the weight of the substrate, $W_1$: the weight of the specimen before immersion, $W_2$: the weight of the specimen after immersion and drying)

The first photocurable adhesive layer preferably has an adhesion to glass at 25° C. of 1.5 N/inch or less after being cured and heated at 300° C. for 10 minutes (heated and cooled). When the adhesion to glass is within the range, the first photocurable adhesive layer can be more easily separated upon separation. The adhesion to glass is more preferably 1.2 N/inch or less, still more preferably 1.1 N/inch or less, further preferably 1.0 N/inch or less.

The adhesion to glass can be measured by the following method.

The first photocurable adhesive layer is heat-laminated onto quartz glass (produced by Matsunami Glass Ind., Ltd., Large white glass slide with polished edges No. 2 S9112) using a laminator (produced by Lami Corporation Inc., "leon3DX", or its equivalent product) at 100° C. In heat lamination, the first photocurable adhesive layer is laminated onto the glass once at a temperature setting value of 100° C. and a speed setting value of 5. After heat lamination, the first photocurable adhesive layer is cured by irradiation with 1,000 mJ/cm$^2$ of UV light at 405 nm at an irradiation intensity of 70 mW/cm$^2$ using an ultra-high pressure mercury lamp, and then heated from the glass side on a hot plate at 300° C. for 10 minutes. The first photocurable adhesive layer after being cured and heated at 300° C. for 10 minutes is subjected to a 180° peel test in an environment at 25° C. and a relative humidity of 50% at a tensile speed of 300 mm/min, and the adhesion is measured.

The thickness of the first photocurable adhesive layer is not limited. The lower limit thereof is preferably 5 μm, and the upper limit thereof is preferably 550 μm. When the thickness is 5 μm or greater, the first photocurable adhesive layer can have sufficient initial adhesion. When the thickness is 550 μm or less, the first photocurable adhesive layer can exhibit high flexibility, and thus can exhibit high conformability to adherends with irregularities and be more easily separated upon separation. The lower limit of the thickness is more preferably 10 μm, still more preferably 20 μm, further preferably 30 μm. The upper limit of the thickness is more preferably 400 μm, still more preferably 300 μm, further preferably 200 μm, even further preferably 150 μm.

The second adhesive layer is not limited. The second adhesive layer used may be a curable adhesive layer having the same composition, physical properties, thickness, and the like as the first photocurable adhesive layer. The second adhesive layer may or may not contain the gas generating agent.

The temporary fixing material of the present invention has a light transmittance at 405 nm of 10% or greater. When the light transmittance at 405 nm is 10% or greater, photocuring reaction in the photocurable adhesive sufficiently progresses, preventing a rise in adhesion or the generation of adhesive deposits upon separation. The light transmittance at 405 nm is preferably 15% or greater, more preferably 30% or greater, still more preferably 40% or greater, further preferably 55% or greater. The upper limit of the light transmittance at 405 nm is not limited, but is practically around 90%.

The light transmittance at 405 nm is measured using a UV integrating illuminometer (UVPF-A2, produced by Eye Graphics Co., Ltd.). Specifically, an integrated amount of light ($I_0$) is measured when irradiation with UV light at 405 nm at an irradiation intensity of 70 mW/cm$^2$ is performed for 10 seconds, and an integrated amount of light ($I_1$) is measured when the temporary fixing material is attached to the light receiver of the illuminometer and irradiated with UV light at 405 nm at an irradiation intensity of 70 mW/cm$^2$ for 10 seconds. The light transmittance can be calculated based on the $I_0$ and $I_1$ by the following equation.

$$\text{Light transmittance at 405 nm (\%)}=100\times I_1/I_0$$

The temporary fixing material of the present invention has a 5% weight loss temperature of 350° C. or higher. When the 5% weight loss temperature is 350° C. or higher, the photocurable adhesive can exhibit high heat resistance. In other words, the photocurable adhesive can prevent a rise in adhesion or the generation of adhesive deposits upon separation even when high-temperature processing at 300° C. or higher is performed. The 5% weight loss temperature is more preferably 380° C. or higher, still more preferably 400° C. or higher. The upper limit of the 5% weight loss temperature is not limited, but is practically around 600° C.

The 5% weight loss temperature is measured using a thermogravimetry-differential thermal analyzer (STA7200RV, produced by Hitachi High-Tech Science Corporation, or its equivalent product). Specifically, the photocurable adhesive is irradiated with 1,000 mJ/cm$^2$ of UV light at 405 nm at an irradiation intensity of 70 mW/cm$^2$, and then weighed out into an aluminum pan. The aluminum pan is set in the device, and heated from 30° C. to 500° C. at a heating rate of 10° C./min in a nitrogen atmosphere. The temperature at which a 5% weight loss of the sample occurs compared to the weight before heating is determined as the 5% weight loss temperature.

The light transmittance at 405 nm may be adjusted to the above range by any method. For example, the composition of the photocurable adhesive may be adjusted to increase the light transmission. Specifically, for example, at least one selected from the group consisting of the resin (1) having an imide skeleton in a backbone repeating unit and the polyfunctional monomer or polyfunctional oligomer (2) to be used preferably contains an aliphatic group derived from a diamine compound, more preferably an aliphatic group derived from a dimer diamine. Alternatively, the light transmittance at 405 nm may be adjusted to be within the above range by, for example, adjusting the thickness of the photocurable adhesive layer containing the photocurable adhesive, or adjusting the material and the thickness of the substrate, if the substrate is included.

The 5% weight loss temperature may be adjusted to be within the range by any method. For example, the composition of the photocurable adhesive may be adjusted to increase the heat resistance. Specifically, for example, the resin (1) having an imide skeleton in a backbone repeating unit to be used preferably contains an aromatic group.

In this way, adjusting both the light transmittance at 405 nm and the 5% weight loss temperature to be within the above ranges requires appropriate adjustment of the proportion of aliphatic groups and aromatic groups in the resin (1) having an imide skeleton in a backbone repeating unit and the polyfunctional monomer or polyfunctional oligomer (2).

The temporary fixing material of the present invention preferably has an adhesion to glass at 25° C. of 1.5 N/inch or less after being cured and heated at 300° C. for 10 minutes (heated and left to cool). When the adhesion to glass is within the range, the photocurable adhesive can be more easily separated upon separation. The adhesion to glass is more preferably 1.2 N/inch or less, still more preferably 1.1 N/inch or less, further preferably 1.0 N/inch or less.

The adhesion to glass is measured by the following method.

The temporary fixing material is heat-laminated onto glass (produced by Matsunami Glass Ind., Ltd., Large white glass slide with polished edges No. 2) using a laminator (produced by Lami Corporation Inc., Leon13DX) at 100° C. In heat lamination, the temporary fixing material is laminated onto the glass once at a temperature setting value of 100° C. and a speed setting value of 5. After heat lamination, the temporary fixing material is irradiated from the glass side with 1,000 $mJ/cm^2$ of UV light at 405 nm at an irradiation intensity of 70 $mW/cm^2$ using an ultra-high pressure mercury lamp. After curing, the temporary fixing material is heated from the glass side on a hot plate at 300° C. for 10 minutes. After heating, the temporary fixing material is left to cool, and the temporary fixing material after being cured and heated at 300° C. for 10 minutes is subjected to a 180° peel test under the conditions of 25° C. and a tensile speed of 300 mm/min, whereby the adhesion is measured.

While the temporary fixing material of the present invention has initial adhesion, it can prevent a rise in adhesion or the generation of adhesive deposits upon separation and can be easily separated upon separation.

Thus, the temporary fixing material of the present invention can be suitably used to protect and temporarily fix adherends to be subjected to high-temperature processing at 300° C. or higher. In particular, for easier handling and less breakage of electronic components (e.g., semiconductors) during processing of electronic components, the temporary fixing material may be suitably used to fix electronic components to supports, or may be suitably bonded to electronic components to protect the components. In other words, the temporary fixing material of the present invention is preferably used for a production process of an electronic component.

The present invention also encompasses a method for producing an electronic component, including: a temporary fixing step of temporarily fixing an electronic component to the temporary fixing material of the present invention; a curing step of curing the photocurable adhesive of the temporary fixing material of the present invention; a heat treatment step of heat-treating the electronic component; and a separation step of separating the electronic component from the temporary fixing material of the present invention.

The curing step of curing the photocurable adhesive of the temporary fixing material of the present invention may be performed immediately before the separation step of separating the electronic component from the temporary fixing material of the present invention. Preferably, the curing step is performed after the temporary fixing step of temporarily fixing the electronic component to the temporary fixing material of the present invention but before the heat treatment step of heat-treating the electronic component. Performing the curing step of curing the photocurable adhesive of the temporary fixing material of the present invention before the heat treatment step of heat-treating the electronic component allows the temporary fixing material to exhibit better heat resistance.

The present invention also encompasses a method for producing an electronic component using the temporary fixing material of the present invention including a first photocurable adhesive layer containing the photocurable adhesive containing the gas generating agent and a second adhesive layer, the method including: a support bonding step of bonding the first photocurable adhesive layer of the temporary fixing material and a support; an adherend bonding step of bonding the second adhesive layer of the temporary fixing material and an electronic component; a curing step of curing the first photocurable adhesive layer and the second adhesive layer; a heat treatment step of heat-treating the electronic component; a gas generation step of generating gas from the first photocurable adhesive layer; and a separation step of separating the support and the temporary fixing material from each other.

The curing step may be performed immediately before the gas generation step. Preferably, the curing step is performed after the support bonding step and the adherend bonding step but before the heat treatment step. Performing the curing step before the heat treatment step allows the temporary fixing material to exhibit better heat resistance.

Examples of the support include glass substrates and quartz substrates. Examples of the adherend include silicon wafers.

Advantageous Effects of Invention

The present invention can provide a temporary fixing material that is easily separable even after high-temperature processing at 300° C. or higher (e.g., heating at 300° C. to 450° C.) with an adherend fixed thereon. The present invention can also provide a method for producing an electronic component using the temporary fixing material.

DESCRIPTION OF EMBODIMENTS

Embodiments of the present invention are more specifically described in the following with reference to, but not limited to, examples.

(Preparation of Resin (1-I) Containing Double Bond-Containing Functional Group and Having Imide Skeleton in Backbone Repeating Unit)

Synthesis Example 1

A 500-mL round flask with a Teflon (*) stirrer placed therein was charged with 250 mL of toluene. Then, 35 g (0.35 mol) of triethylamine and 35 g (0.36 mol) of methanesulfonic anhydride were added, and the mixture was stirred to form salt. After stirring for 10 minutes, 56 g (0.1 mol) of dimer diamine (Produced by Croda, Priamine 1075) and 19.1 g (0.09 mol) of pyromellitic anhydride were added in this order. A Dean-Stark trap and a condenser were fitted to the flask and the mixture was refluxed for two hours for formation of amine-terminated diimide. After cooling to room temperature or lower, the reaction product was blended with 12.8 g (0.13 mol) of maleic anhydride and then with 5 g (0.05 mol) of methanesulfonic anhydride. The mixture was further refluxed for 12 hours and then cooled to room temperature. To the flask was added 300 mL of toluene, and the flask was allowed to stand still for removal of precipitated impurities. The obtained solution was filtered through a glass frit funnel filled with silica gel, followed by removal of the solvent in vacuum. Thus, an amber wax-like resin (1-I) represented by the following formula (A), containing maleimide groups at both ends and having an imide skeleton in a backbone repeating unit, was obtained.

The weight average molecular weight of the obtained resin was 5,000, as determined by gel permeation chromatography (GPC) in which the eluent used was THF and the column used was HR-MB-M (trade name, produced by Waters Corporation).

[Chem. 5]

(A)

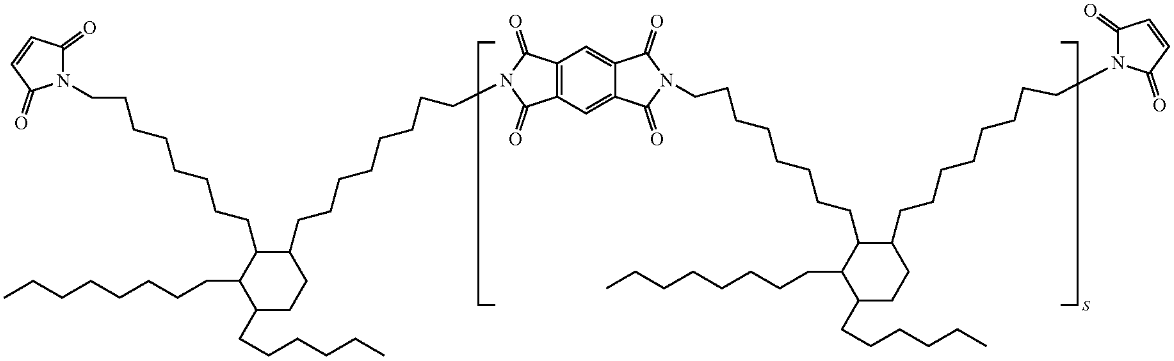

(Preparation of Resin (1-I) Containing Double Bond-Containing Functional Group and Having Imide Skeleton in Backbone Repeating Unit)

Synthesis Example 2

A 500-mL round flask with a Teflon (*) stirrer placed therein was charged with 250 mL of toluene. Then, 35 g (0.35 mol) of triethylamine and 35 g (0.36 mol) of methanesulfonic anhydride were added, and the mixture was stirred to form salt. After stirring for 10 minutes, 36 g (0.1 mol) of 4,4'-bis(4-aminophenoxy)biphenyl (produced by Tokyo Chemical Industry Co., Ltd.) and 19.1 g (0.09 mol) of pyromellitic anhydride were added in this order. A Dean-Stark trap and a condenser were fitted to the flask and the mixture was refluxed for two hours for formation of amine-terminated diimide. After cooling to room temperature or lower, the reaction product was blended with 12.8 g (0.13 mol) of maleic anhydride and then with 5 g (0.05 mol) of methanesulfonic anhydride. The mixture was further refluxed for 12 hours and then cooled to room temperature. To the flask was added 300 mL of toluene, and the flask was allowed to stand still for removal of precipitated impurities. The obtained solution was filtered through a glass frit funnel filled with silica gel, followed by removal of the solvent in vacuum. Thus, an amber wax-like resin (1-I) represented by the following formula (B), containing maleimide groups at both ends and having an imide skeleton in a backbone repeating unit, was obtained.

The weight average molecular weight of the obtained resin was 1,0000, as determined by gel permeation chromatography (GPC) in which the eluent used was THF and the column used was HR-MB-M (trade name, produced by Waters Corporation).

(Preparation of Resin (1-I) Containing Double Bond-Containing Functional Group and Having Imide Skeleton in Backbone Repeating Unit)

Synthesis Example 3

A 500-mL round flask with a Teflon (*) stirrer placed therein was charged with 250 mL of toluene. Then, 35 g (0.35 mol) of triethylamine and 35 g (0.36 mol) of methanesulfonic anhydride were added, and the mixture was stirred to form salt. After stirring for 10 minutes, 200 g (0.1 mol) of polyethyleneoxide diamine (JEFFAMINE D-2000, produced by Huntsman Corporation) and 20 g (0.09 mol) of 1,2,4,5-cyclohexanetetracarboxylic dianhydride (produced by Mitsubishi Gas Chemical Company, Inc., HPMDA) were added in this order. A Dean-Stark trap and a condenser were fitted to the flask and the mixture was refluxed for two hours for formation of amine-terminated diimide. After cooling to room temperature or lower, the reaction product was blended with 12.8 g (0.13 mol) of maleic anhydride and then with 5 g (0.05 mol) of methanesulfonic anhydride. The mixture was further refluxed for 12 hours and then cooled to room temperature. To the flask was added 300 mL of toluene, and the flask was allowed to stand still for removal of precipitated impurities. The obtained solution was filtered through a glass frit funnel filled with silica gel, followed by removal of the solvent in vacuum. Thus, an amber wax-like resin (1-I) containing maleimide groups at both ends and having an imide skeleton in a backbone repeating unit, was obtained.

The weight average molecular weight of the obtained resin was 40,000, as determined by gel permeation chroma-

[Chem. 6]

(B)

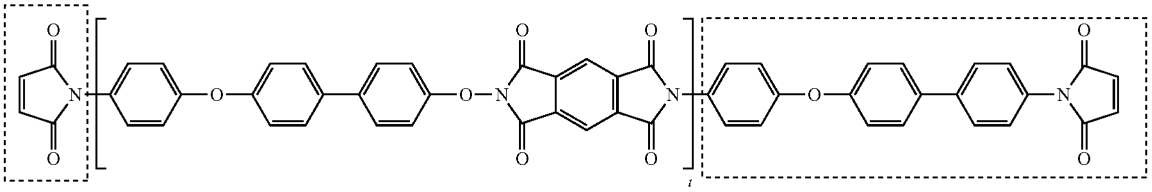

tography (GPC) in which the eluent used was THF and the column used was HR-MB-M (trade name, produced by Waters Corporation).

(Preparation of Resin (1-II) not Containing Double Bond-Containing Functional Group and Having Imide Skeleton in Backbone Repeating Unit)

A 500-mL round flask with a Teflon (*) stirrer placed therein was charged with 250 mL of toluene. Then, 35 g (0.35 mol) of triethylamine and 35 g (0.36 mol) of methanesulfonic anhydride were added, and the mixture was stirred to form salt. After stirring for 10 minutes, 31.9 g (0.06 mol) of dimer diamine (Produced by Croda, Priamine 1075), 5.5 g (0.015 mol) of Bis-AP-AF, and 39 g (0.075 mol) of 4,4'-(4,4'-isopropylidenediphenoxy)diphthalic anhydride were added in this order. A Dean-Stark trap and a condenser were fitted to the flask and the mixture was refluxed for two hours and cooled to room temperature. To the flask was added 300 mL of toluene, and the flask was allowed to stand still for removal of precipitated impurities. The obtained solution was filtered through a glass frit funnel filled with silica gel, followed by removal of the solvent in vacuum. Thus, a brown, solid resin (1-II) represented by the following formula (D), not containing a double bond-containing functional group and having an imide skeleton in a backbone repeating unit, was obtained.

The weight average molecular weight of the obtained resin was 72,000, as determined by gel permeation chromatography (GPC) in which the eluent used was THF and the column used was HR-MB-M (trade name, produced by Waters Corporation).

[Chem. 7]

(D)

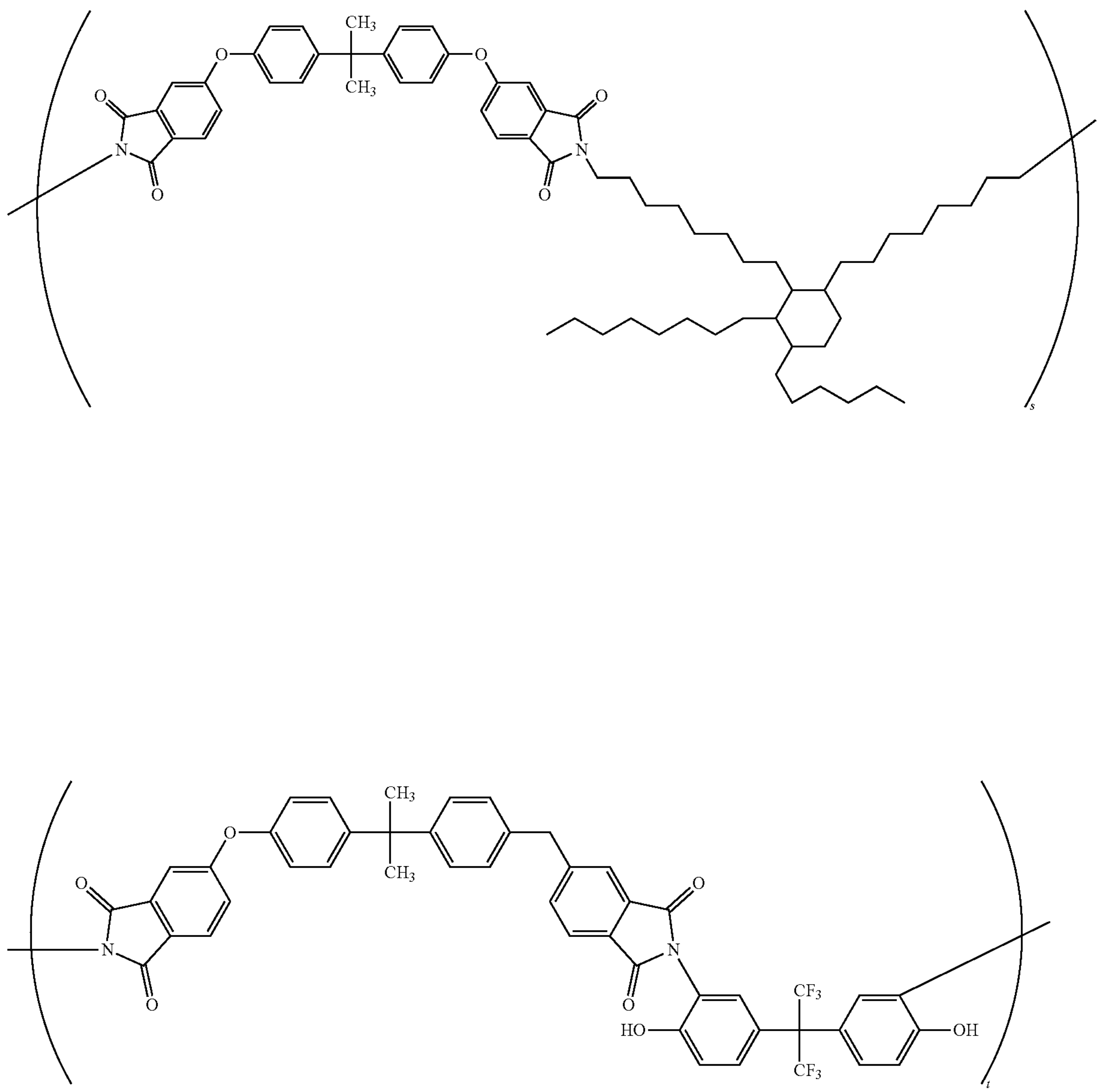

(Preparation of Polyfunctional Monomer or Polyfunctional Oligomer (2))

A 500-mL round flask with a Teflon (*) stirrer placed therein was charged with 250 mL of toluene. Then, 56 g (0.1 mol) of dimer diamine (produced by Croda, Priamine 1075) and 19.6 g (0.2 mol) of maleic anhydride were added, and subsequently 5 g of methanesulfonic anhydride was added. The solution was refluxed for 12 hours and then cooled to room temperature. To the flask was added 300 mL of toluene, and the flask was allowed to stand still for removal of precipitated salt. The obtained solution was filtered through a glass frit funnel filled with silica gel, followed by removal of the solvent in vacuum. Thus, a brown, liquid bismaleimide monomer (2) represented by the following formula (E) was obtained.

[Chem. 8]

(E)

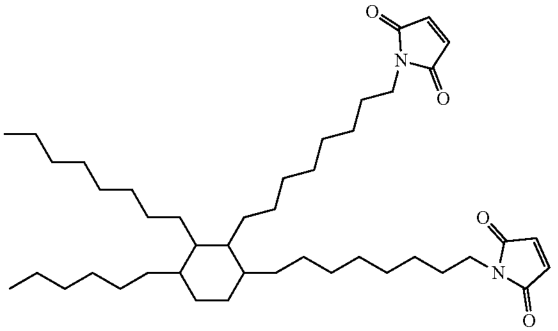

Preparation of Acrylic Curable Resin

A reactor equipped with a thermometer, a stirrer, and a condenser was charged with 94 parts by weight of 2-ethylhexyl acrylate as a (meth)acrylic acid alkyl ester, 6 parts by weight of hydroxyethyl methacrylate as a functional group-containing monomer, 0.01 parts by weight of lauryl mercaptan, and 80 parts by weight of ethyl acetate. The reactor was then heated to initiate reflux. To the reactor was subsequently added 0.01 parts by weight of 1,1-bis(t-hexylperoxy)-3,3,5-trimethylcyclohexane as a polymerization initiator to initiate polymerization under reflux. Then, 0.01 parts by weight of 1,1-bis(t-hexylperoxy)-3,3,5-trimethylcyclohexane was added one hour after and two hours after the start of the polymerization. Four hours after the start of the polymerization, 0.05 parts by weight of t-hexyl peroxypivalate was added to continue the polymerization reaction. Eight hours after the start of the polymerization, an ethyl acetate solution of a functional group-containing (meth) acrylic polymer having a solid content of 55% by weight and a weight average molecular weight of 500,000 was obtained.

To 100 parts by weight of the resin solid content of the obtained ethyl acetate solution containing a functional group-containing (meth)acrylic polymer was added 3.5 parts by weight of 2-isocyanatoethyl methacrylate as a functional group-containing unsaturated compound and reacted. Thus, an acrylic reactive resin was obtained.

The weight average molecular weight of the obtained acrylic reactive resin was 550,000, as determined by gel permeation chromatography (GPC) in which the eluent used was THF and the column used was HR-MB-M (trade name, produced by Waters Corporation).

Example 1

(1) Production of Temporary Fixing Material

To 150 mL of toluene were added 70 parts by weight of the resin (1-II) obtained above and 30 parts by weight of the bismaleimide monomer (2) obtained above. Further, 2 parts by weight of Irgacure 819 (produced by BASF, molar absorption coefficient at 405 nm: 450) was added as a photopolymerization initiator, whereby a toluene solution of a photocurable adhesive was prepared.

A 50-μm-thick PET film one surface of which was release-treated was provided. The obtained toluene solution of a photocurable adhesive was applied with a doctor knife to the release-treated surface to a dry film thickness shown in Table 1, and the applied solution was dried by heating at 130° C. for 10 minutes. Thus, a temporary fixing material (non-supported) including a photocurable adhesive layer was obtained.

Examples 2 to 14 and Comparative Examples 1 to 4

A toluene solution of a photocurable adhesive and a temporary fixing material were obtained as in Example 1 except that the composition and thickness of the photocurable adhesive were changed as shown in Table 1 or 2. The materials used are as follows.

Acrylic non-curable resin (SK-Dyne 1604N, produced by Soken Chemical & Engineering Co., Ltd.)

Polyfunctional acrylic monomer (SR-387, produced by Arkema Inc., Tris(2-acryloxyethyl)Isocyanurate)

Silicone compound (bifunctional silicone acrylate, produced by Daicel-Allnex Ltd., EBECRYL 350)

Silicone compound (polyether-modified polydimethylsiloxane containing an acrylic group, produced by BYK-Chemie, BYK-UV3500)

Crosslinking agent (isocyanate crosslinking agent, Coronate L, produced by Nihon Urethane Kogyo)

Example 15

(1) Formation of First Photocurable Adhesive Layer (Gas Generating Agent-Containing Curable Adhesive Layer)

To 300 mL of toluene were added 100 parts by weight of the reactive resins shown in Table 3, 30 parts by weight of 5,5'-bi-1H-tetrazole disodium salt (BHT-2Na) as a gas generating agent, 5 parts by weight of EBECRYL 350 as a silicone compound, and 2 parts by weight of Irgacure 819 (produced by BASF) as a photopolymerization initiator. Thus, a toluene solution of a photocurable adhesive in which 5,5'-Bi-1H-tetrazole disodium salt (BHT-2Na) was dispersed was prepared.

A 50-μm-thick polyethylene terephthalate film having a release-treated surface was provided as a separator. The obtained toluene solution of a photocurable adhesive was applied with a doctor knife to the film to a dry film thickness of 50 μm. The applied solution was dried by heating for 10 minutes in an oven preheated to 110° C. Thus, a first photocurable adhesive layer (gas generating agent-containing curable adhesive layer) was obtained.

(2) Formation of Second Adhesive Layer

To 300 mL of toluene were added 100 parts by weight of the reactive resins shown in Table 3, 5 parts by weight of EBECRYL 350 as a silicone compound, and 2 parts by weight of Irgacure 819 (produced by BASF) as a photopolymerization initiator. Thus, a toluene solution of a photocurable adhesive was prepared.

A 50-μm-thick polyethylene terephthalate film having a release-treated surface was provided as a separator. The obtained toluene solution of a photocurable adhesive was applied with a doctor knife to the film to a dry film thickness of 50 μm. The applied solution was dried by heating for 10 minutes in an oven preheated to 110° C. Thus, a second adhesive layer was obtained.

(3) Production of Temporary Fixing Material

The adhesive layer surfaces of the first photocurable adhesive layer (gas generating agent-containing curable adhesive layer) and the second adhesive layer were laminated, whereby a temporary fixing material in which both surfaces were covered with separators were obtained.

Example 16

A photocurable adhesive and a temporary fixing material were obtained as in Example 15 except that the composition and the thickness of the photocurable adhesive layer and the adhesive layer were changed as shown in Table 3.

Examples 17 to 22

A toluene solution of a photocurable adhesive and a temporary fixing material were obtained as in Example 1 except that the composition and thickness of the photocurable adhesive and the amount of the inorganic filler were changed as shown in Table 4. The materials used are as follows.

Fluorine compound (photoreactive fluorine compound, produced by DIC Corporation, MEGAFACE RS-56)

Inorganic filler (silica particles, produced by Tokuyama Corporation, MT-10, average particle size 15 nm)

Inorganic filler (silica particles, produced by Tatsumori Ltd., 5×, average particle size 1 μm)

<Measurement of Physical Properties>

(Measurement of Light Transmittance)

Each obtained temporary fixing material was attached to the light receiver of a UV integrating illuminometer (UVPF-A2, produced by Eye Graphics Co., Ltd.), and the integrated amount of light ($I_1$) was measured when the temporary fixing material was irradiated with UV light at 405 nm at an irradiation intensity of 70 mW/cm$^2$ for 10 seconds. The integrated amount of light ($I_0$) was measured when irradiation with UV light at 405 nm at an irradiation intensity of 70 mW/cm$^2$ was performed for 10 seconds. The light transmittance at 405 nm of the temporary fixing material was calculated by the following equation. Light transmittance at 405 nm (%)=100×$I_1/I_0$ (Measurement of 5% Weight Loss Temperature)

Each obtained temporary fixing material was irradiated with 1,000 mJ/cm$^2$ of UV light at 405 nm at an irradiation intensity of 70 mW/cm$^2$, and 10 mg of the material was weighed into an aluminum pan. The aluminum pan was set in the device, and heated from 30° C. to 500° C. at 10° C./min in a nitrogen atmosphere. The temperature at which a 5% weight loss of the sample occurred compared to the weight before heating was determined as the 5% weight loss temperature.

(3) Measurement of Adhesion to Glass at 25° C. After Curing And Heating at 300° C. For 10 Minutes Each obtained temporary fixing material was cut into a width of 1 inch and then heat-laminated onto a 1-mm-thick glass (produced by Matsunami Glass Ind., Ltd., Large white glass slide with polished edges No. 2) using a laminator (produced by Lami Corporation Inc., Leon13DX, speed 5 on the scale) at 100° C. After lamination, the temporary fixing material was irradiated from the glass side with 1,000 mJ/cm$^2$ of UV light at 405 nm at an irradiation intensity of 70 mW/cm$^2$. After curing, the release PET film of the temporary fixing material was removed, followed by heating from the glass side on a hot plate at 300° C. for 10 minutes.

The temporary fixing material after being cured and heated at 300° C. for 10 minutes (heated and left to cool) was subjected to a 180° peel test under the conditions of 25° C. and a tensile speed of 300 mm/min.

In Examples 15 and 16, the measurement was performed on the surface of the first photocurable adhesive layer and the surface of the second photocurable adhesive layer separately. For the adhesion of the first photocurable adhesive layer to glass, the temporary fixing material after heating at 300° C. for 10 minutes and being left to cool was irradiated from the glass side with UV light at 254 nm at an intensity of 20 mW/cm$^2$ for 180 seconds using a high pressure mercury lamp so that gas was generated. The 180° peel test was then performed under the conditions of 25° C. and a tensile speed of 300 mm/min.

(Measurement of Modulus of Elasticity)

A specimen having a size of 5 mm×35 mm×thickness 0.03 mm was prepared from each obtained temporary fixing material. The obtained specimen was cured by irradiation with 1,000 mJ/cm$^2$ of UV light at 405 nm at an irradiation intensity of 70 mW/cm$^2$. The cured specimen was immersed in liquid nitrogen and cooled to −50° C. The sample was then heated to 300° C. using a viscoelastic spectrometer (DVA-200, produced by IT Measurement Co., Ltd.) under the conditions of a constant-rate heating tensile mode, a heating rate of 10° C./min, and a frequency of 10 Hz, and the storage modulus of elasticity was measured. From the obtained results of the storage modulus of elasticity, the modulus of elasticity at 25° C. and the modulus of elasticity at 300° C. were determined.

<Evaluation>

The temporary fixing materials obtained in the examples and the comparative examples were evaluated by the following methods. Tables 1 to 4 show the results.

(1) Measurement of Gel Fraction after Curing

The photocurable adhesive layer of each obtained temporary fixing material was irradiated with 1,000 mJ/cm$^2$ of UV light at 405 nm at an irradiation intensity of 70 mW/cm$^2$. The gel fraction was then measured by the following method.

The temporary fixing material was cut into a flat rectangular specimen having a size of 50 mm×100 mm. The specimen was immersed in toluene at 23° C. for 24 hours, then taken out of the toluene, and dried at 110° C. for one hour. The weight of the dried specimen was measured, and the gel fraction was calculated using the following equation (1). No release film to protect the photocurable adhesive layer was stacked on the specimen.

In Examples 15 and 16, the second adhesive layer was cured by irradiation with 1,000 mJ/cm$^2$ of UV light at 405 nm at an irradiation intensity of 70 mW/cm$^2$ and then weighed out as a specimen. The specimen thus weighed out was used to measure the gel fraction in the same manner. As this specimen included no substrate, $W_0$ was 0.

$$\text{Gel fraction (\% by weight)}=100\times(W_2-W_0)/(W_1-W_0) \quad (1)$$

($W_0$: the weight of the substrate, $W_1$: the weight of the specimen before immersion, $W_2$: the weight of the specimen after immersion and drying)

The gel fraction was evaluated in accordance with the following criteria.

○○ (Excellent): Gel fraction of 80% or greater

○ (Good): Gel fraction of 60% or greater and less than 80%

Δ (Fair): Gel fraction of 20% or greater and less than 60% x (Poor): Gel fraction of less than 20%

(2) Evaluation of Residues after Curing and Heating at 300° C. For 10 Minutes

The temporary fixing material was cut into a width of 1 inch and heat-laminated onto 1-mm-thick glass (produced by Matsunami Glass Ind., Ltd., Large white glass slide with polished edges No. 2) using a laminator (produced by Lami Corporation Inc., Leon13DX) at 100° C. In heat lamination, the temporary fixing material was laminated onto the glass once at a temperature setting value of 100° C. and a speed setting value of 5. After heat lamination, the temporary fixing material was irradiated from the glass side with 1,000 $mJ/cm^2$ of UV light at 405 nm at an irradiation intensity of 70 $mW/cm^2$ using an ultra-high pressure mercury lamp. After curing, the release PET film of the temporary fixing material was removed, followed by heating from the glass side on a hot plate at 300° C. for 10 minutes.

After the temporary fixing material after being cured and heated at 300° C. was left to cool, the test sample was subjected to a 180° peel test under the conditions of 25° C. and a tensile speed of 300 mm/min. In Examples 15 and 16, the second adhesive layer was attached to the glass, and the test sample was prepared in the same manner to perform evaluation.

The glass surface after the separation of the temporary fixing material was visually observed and evaluated in accordance with the following criteria.

○○ (Excellent): No adhesive deposits were observed.

○ (Good): Adhesive deposits were observed in less than 5% of the glass area.

Δ (Fair): Adhesive deposits were observed in 5% or more and less than 10% of the glass area.

x (Poor): Adhesive deposits were observed in 10% or more of the glass area.

(3) Evaluation of Detachment and Separability after Curing And Heating at 300° C. For 20 Minutes The temporary fixing materials obtained in Examples 1, 10, and 17 to 22 were further evaluated as follows.

Each obtained temporary fixing material was cut into a width of 1 inch and heat-laminated onto a 1-mm-thick glass using a heat laminator (Leon13DX) at 100° C. with the speed set at 3 on the scale. After lamination, the temporary fixing material was irradiated from the glass side with 1,000 $mJ/cm^2$ of UV light at 405 nm at an irradiation intensity of 70 $mW/cm^2$ using an ultra-high pressure mercury lamp. After curing, the release PET film was removed, followed by heating from the glass side on a hot plate at 300° C. for 20 minutes. This test was performed five times. The appearance of the temporary fixing material after being cured and heated at 300° C. for 20 minutes was visually observed and evaluated in accordance with the following criteria.

○ (Good): No detachment was observed between the temporary fixing material and the glass in any of the five tests.

x (Poor): Partial detachment was observed in some portion(s) between the temporary fixing material and the glass in one or more of the five tests.

The temporary fixing material after being cured and heated at 300° C. for 20 minutes was subjected to a 180° peel test under the conditions of 25° C. and a tensile speed of 300 mm/min. This test was performed five times. The separability of the temporary fixing material was evaluated in accordance with the following criteria. The temporary fixing materials in which partial detachment occurred in the above detachment test were not evaluated.

○○ (Excellent): Separable in all the five tests.

○ (Good): Separable in one to four tests.

x (Poor): Not separable in all the five tests.

TABLE 1

| | | | | | Example 1 | 2 | 3 | 4 | 5 | 6 | 7 | 8 | 9 |
|---|---|---|---|---|---|---|---|---|---|---|---|---|---|
| Photocurable adhesive (parts by weight) | Reactive resin | Resin (1) having imide skeleton in backbone repeating unit | Resin (1-I) Contain double bond-containing functional group | Synthesis Example 1 | — | | | 50 | 50 | 50 | 50 | 60 | 80 |
| | | | | Synthesis Example 2 (aromatic group) | | | | | | | | | |
| | | | | Synthesis Example 3 (aliphatic group) | | | | | | | | | |
| | | | Resin (1-II) Not contain double bond-containing functional group (weight average molecular weight of 20,000 or greater) | | 70 | 70 | 70 | 50 | 50 | 50 | 50 | 40 | 20 |
| | | Polyfunctional monomer or polyfunctional oligomer (2) | Bismaleimide monomer | | 30 | 30 | 30 | | | | | | |
| | | | Polyfunctional acrylic monomer | | | | | | | | | | |
| | | Other resins | Acrylic curable resin | | | | | | | | | | |
| | | | Acrylic non-curable resin | | | | | | | | | | |
| | | Silicone compound | EBECRYL 350 | | | | | | | | | | |
| | | | BYK-UV3500 | | | | | | | | | 5 | 5 |
| | | Crosslinking agent | Coronate L | | | | | | | | | | |
| | | Photopolymerization initiator | Irgacure 819 | | 2 | 2 | 2 | 2 | 2 | 2 | 2 | 2 | 2 |
| Physical properties | Thickness (μm) | | | | 8 | 20 | 50 | 110 | 150 | 200 | 400 | 100 | 100 |
| | Light transmittance (405 nm) (%) | | | | 86 | 79 | 73 | 50 | 42 | 38 | 16 | 55 | 61 |
| | 5% Weight loss temperature (° C.) | | | | 417 | 417 | 417 | 424 | 424 | 424 | 424 | 397 | 103 |
| | Modulus of elasticity at 25° C. (Pa) | | | | $1.2 \times 10^9$ | $1.2 \times 10^9$ | $1.2 \times 10^9$ | $9.7 \times 10^8$ | $9.7 \times 10^8$ | $9.7 \times 10^8$ | $9.7 \times 10^8$ | $8.3 \times 10^8$ | $4.3 \times 10^8$ |
| | Modulus of elasticity at 300° C. (Pa) | | | | $3.9 \times 10^6$ | $3.9 \times 10^6$ | $3.9 \times 10^6$ | $3.5 \times 10^6$ | $3.5 \times 10^6$ | $3.5 \times 10^6$ | $3.5 \times 10^6$ | $3.9 \times 10^6$ | $4.7 \times 10^8$ |
| | Adhesion to glass at 25° C. after curing and heating at 300° C. for 10 minutes (N/inch) | | | | 0.5 | 0.7 | 0.8 | 0.4 | 0.5 | 0.8 | 1.1 | 0.2 | 0.1 |
| Evaluation | Gel fraction after curing (% by weight) | | | | ○○ | ○○ | ○ | Δ | Δ | Δ | Δ | ○ | |
| | Residues after curing and heating at 300° C. for 10 minutes | | | | ○ | ○ | ○ | ○ | ○ | ○ | Δ | ○○ | |

TABLE 1-continued

| | | | | | | Example | | | | |
|---|---|---|---|---|---|---|---|---|---|---|
| | | | | | | 10 | 11 | 12 | 13 | 14 |
| Photocurable adhesive (parts by weight) | Reactive resin | Resin (1) having imide skeleton in back-bone re-peating unit | Resin (1-I) | Contain double bond-con-taining func-tional group | Synthesis Exam-ple 1 | 60 | 60 | 25 | 70 | 50 |
| | | | | | Synthesis Exam-ple 2 (aromatic group) | | | | | |
| | | | | | Synthesis Exam-ple 3 (aliphatic group) | | | | | |
| | | | Resin (1-II) | Not contain double bond-con-taining func-tional group (weight average molecular weight of 20,000 or greater) | | 40 | 40 | 50 | | 50 |
| | | Polyfunctional monomer or polyfunctional oligomer (2) | | Bis-maleimide monomer | | | | 25 | 30 | |
| | | | | Poly-func-tional acrylic monomer | | | | | | |
| | | Other resins | | Acrylic curable resin | | | | | | |
| | | | | Acrylic non-curable resin | | | | | | |

TABLE 1-continued

| | | | | | | | |
|---|---|---|---|---|---|---|---|
| | Silicone compound | EB - ECRYL 350 | 5 | 5 | | | |
| | | BYK-UV3500 | | | | | |
| | Crosslinking agent | Coronate L | | | | | |
| | Photopolymerization initiator | Irgacure 819 | 2 | 2 | 2 | 2 | 2 |
| Physical properties | Thickness (μm) | | 100 | 8 | 46 | 105 | 521 |
| | Light transmittance (405 nm) (%) | | 57 | 84 | 72 | 65 | 11 |
| | 5% Weight loss temperature (C) | | 428 | 428 | 421 | 411 | 424 |
| | Modulus of elasticity at 25° C. (Pa) | | $8.5 \times 10^8$ | $8.5 \times 10^8$ | $1.5 \times 10^8$ | $1.1 \times 10^9$ | $9.7 \times 10^8$ |
| | Modulus of elasticity at 300° C. (Pa) | | $4.1 \times 10^6$ | $4.1 \times 10^6$ | $4.2 \times 10^6$ | $1.3 \times 10^6$ | $3.5 \times 10^6$ |
| | Adhesion to glass at 25° C. after curing and heating at 300° C. for 10 minutes (N/inch) | | 0.2 | 0.1 | 0.7 | 1.3 | 1.3 |
| Evaluation | Gel fraction after curing (% by weight) | | ○ | ○○ | ○○ | ○○ | Δ |
| | Residues after curing and heating at 300° C. for 10 minutes | | ○○ | ○○ | ○ | Δ | Δ |

TABLE 2

| | | | | | | Comparative Example | | | |
|---|---|---|---|---|---|---|---|---|---|
| | | | | | | 1 | 2 | 3 | 4 |
| Photo-curable adhesive (parts by weight) | Reactive resin | Resin (1) having imide skeleton in backbone repeating unit | Resin (1-I) | Contain double bond-containing functional group | Synthesis Example 1 | — | — | — | — |
| | | | | | Synthesis Example 2 (aromatic group) | 100 | — | — | — |
| | | | | | Synthesis Example 3 (aliphatic group) | — | 90 | — | — |
| | | | Resin (1-II) | Not contain double bond-containing functional group (weight average molecular weight of 20,000 or greater) | — | — | — | — | — |
| | Polyfunctional monomer or polyfunctional oligomer (2) | | | Bismaleimide monomer | — | — | — | — | — |
| | | | | Polyfunctional acrylic monomer | — | — | 10 | 10 | — |
| | Other resins | | | Acrylic curable resin | — | — | — | 100 | — |
| | | | | Acrylic non-curable resin | — | — | — | — | 100 |
| | Silicone compound | | | EBECRYL 350 | — | — | 10 | 10 | — |
| | | | | BYK-UV3500 | — | 5 | — | — | — |
| | Crosslinking agent | | | Coronate L | — | — | 1 | 1 | — |
| | Photopolymerization initiator | | | Irgacure 819 | — | 2 | 2 | 2 | — |
| Physical properties | Thickness (μm) | | | | — | 100 | 100 | 70 | 25 |
| | Light transmittance (405 nm) (%) | | | | — | 3 | 67 | 65 | 80 |
| | 5% Weight loss temperature (° C.) | | | | — | 451 | 343 | 322 | 275 |
| | Modulus of elasticity at 25° C. (Pa) | | | | — | $1.7 \times 10^9$ | $9.2 \times 10^7$ | $1.1 \times 10^7$ | $4.07 \times 10^5$ |
| | Modulus of elasticity at 300° C. (Pa) | | | | — | $3.8 \times 10^5$ | $9.6 \times 10^5$ | $1.0 \times 10^7$ | $1.7 \times 10^5$ |
| | Adhesion to glass at 25° C. after curing and heating at 300° C. for 10 minutes (N/inch) | | | | — | Not separable | 0.5 | 1.8 | Not separable |
| Evaluation | Gel fraction after curing (% by weight) | | | | — | x | ○ | ○ | Not cured |
| | Residues after curing and heating at 300° C. for 10 minutes | | | | — | x | x | x | x |

TABLE 3

| | | | | | | | Example | |
|---|---|---|---|---|---|---|---|---|
| | | | | | | | 15 | 16 |
| First photo-curable adhesive layer | Photo-curable adhesive (parts by weight) | Reactive resin | Resin (1) having imide skeleton in backbone unit | Resin (1-I) | Contain double bond-containing functional group | Synthesis Example 1 | 60 | — |
| | | | | | | Synthesis Example 2 (aromatic group) | — | — |
| | | | | | | Synthesis Example 3 (aliphatic group) | — | — |
| | | | | Resin (1-II) | Not contain double bond-containing functional group (weight average molecular weight of 20,000 or greater) | — | 40 | 70 |
| | | Polyfunctional monomer or polyfunctional oligomer (2) | | | Bismaleimide monomer | — | — | 30 |
| | | | | | Polyfunctional acrylic monomer | — | — | — |
| | | Silicone compound | | | EBECRYL 350 | — | 5 | 5 |
| | | | | | BYK-UV3500 | — | — | — |
| | | Photopolymerization initiator | | | Irgacure 819 | — | 2 | 2 |
| | | Gas generating agent | | | BHT-2Na | — | 30 | 30 |
| | Thickness (μm) | | | | | | 50 | 50 |
| | Modulus of elasticity at 25° C. (Pa) | | | | | — | $8.5 \times 10^8$ | $1.0 \times 10^9$ |
| | Modulus of elasticity at 300° C. (Pa) | | | | | — | $4.0 \times 10^6$ | $3.6 \times 10^6$ |

TABLE 3-continued

| | | | | | | | Example | |
|---|---|---|---|---|---|---|---|---|
| | | | | | | | 15 | 16 |
| Second adhesive layer | Photo-curable adhesive (parts by weight) | Reactive resin | Resin (1) having imide skeleton in backbone unit | Resin (1-I) | Contain double bond-containing functional group | Synthesis Example 1 | 60 | |
| | | | | | | Synthesis Example 2 (aromatic group) | — | — |
| | | | | | | Synthesis Example 3 (aliphatic group) | — | — |
| | | | | Resin (1-II) | Not contain double bond-containing functional group (weight average molecular weight of 20,000 or greater) | — | 40 | 70 |
| | | | Polyfunctional monomer or polyfunctional oligomer (2) | | Bismaleimide monomer | — | — | 30 |
| | | | | | Polyfunctional acrylic monomer | — | — | — |
| | | | Silicone compound | | EBECRYL 350 | — | 5 | 5 |
| | | | Photopolymerization initiator | | Irgacure 819 | — | 2 | 2 |
| | | | Thickness (μm) | | | — | 50 | 50 |
| Physical properties | Modulus of elasticity at 25° C. (Pa) | | | | | — | $8.5 \times 10^8$ | $1.0 \times 10^9$ |
| | Modulus of elasticity at 300° C. (Pa) | | | | | — | $4.1 \times 10^6$ | $3.6 \times 10^6$ |
| | Light transmittance (405 nm) (%) | | | | | — | 46 | 50 |
| | 5% Weight loss temperature (° C.) | | | | | — | 417 | 419 |
| Evaluation | Adhesion of second adhesive layer to glass at 25° C. after curing and heating at 300° C. for 10 minutes (N/inch) | | | | | — | 0.5 | 0.4 |
| | Adhesion of first photocurable adhesive layer to glass at 25° C. after curing and heating at 300° C. for 10 minutes (N/inch) | | | | | — | 0.1 | 0.1 |
| | Gel fraction of second adhesive layer after curing (% by weight) | | | | | — | Δ | Δ |
| | Residues after curing and heating at 300° C. for 10 minutes | | | | | — | ○ | ○ |

TABLE 4

| | | | | | | Example | | | | | | | |
|---|---|---|---|---|---|---|---|---|---|---|---|---|---|
| | | | | | | 1 | 10 | 17 | 18 | 19 | 20 | 21 | 22 |
| Photocurable adhesive (parts by weight) | Reactive resin | Resin (1) having imide skeleton in backbone repeating unit | Resin (1-I) | Contain double bond-containing functional group | Synthesis Example 1 | — | 60 | 60 | 60 | 60 | 60 | 60 | — |
| | | | | | Synthesis Example 2 (aromatic group) | — | — | — | — | — | — | — | — |
| | | | | | Synthesis Example 3 (aliphatic group) | — | — | — | — | — | — | — | — |
| | | | Resin (1-II) | Not contain double bond-containing functional group (weight average molecular weight of 20,000 or greater) | — | 70 | 40 | 40 | 40 | 40 | 40 | 40 | 70 |
| | | Polyfunctional monomer or polyfunctional oligomer (2) | | Bismaleimide monomer | — | 30 | — | — | — | — | — | — | 30 |
| | | | | Polyfunctional acrylic monomer | — | — | — | — | — | — | — | — | — |
| | Other resins | | | Acrylic curable resin | — | — | — | — | — | — | — | — | — |
| | | | | Acrylic non-curable resin | — | — | — | — | — | — | — | — | — |
| | Silicone compound/ fluorine compound | | | EBECRYL 350 | — | — | 5 | 5 | 5 | 5 | — | 5 | 5 |
| | | | | MEGAFACE | — | — | — | — | — | — | 5 | — | — |
| | Photopolymerization initiator | | | Irgacure 819 | — | 2 | 2 | 2 | 2 | 2 | 2 | 2 | — |
| | Inorganic filler | | | MT-10 (15 nm) | — | — | — | 1 | 5 | 15 | 1 | — | 5 |
| | | | | 5× (1 μm) | — | — | — | — | — | — | — | 5 | — |
| Physical properties | Thickness (μm) | | | | — | 8 | 100 | 100 | 100 | 100 | 100 | 100 | 100 |
| | Light transmittance (405 nm) (%) | | | | — | 86 | 57 | 59 | 63 | 64 | 58 | 60 | 52 |
| | 5% Weight loss temperature (° C.) | | | | — | 417 | 428 | 430 | 433 | 436 | 425 | 434 | 414 |
| | Modulus of elasticity at 25° C. (Pa) | | | | — | $1.2 \times 10^9$ | $8.5 \times 10^8$ | $8.9 \times 10^8$ | $9.3 \times 10^8$ | $1.0 \times 10^9$ | $8.6 \times 10^8$ | $9.9 \times 10^8$ | $1.4 \times 10^9$ |
| | Modulus of elasticity at 300° C. (Pa) | | | | — | $3.9 \times 10^6$ | $4.1 \times 10^6$ | $7.7 \times 10^6$ | $8.0 \times 10^6$ | $8.9 \times 10^6$ | $5.7 \times 10^6$ | $9.1 \times 10^6$ | $4.1 \times 10^6$ |
| | Adhesion to glass at 25° C. after curing and heating at 300° C. for 10 minutes (N/inch) | | | | — | 0.5 | 0.2 | 0.2 | 0.3 | 0.6 | 0.2 | 0.5 | 0.5 |
| Evaluation | Gel fraction after curing (% by weight) | | | | — | ○○ | ○ | ○ | ○ | ○ | ○ | ○ | ○ |
| | Residues after curing and heating at 300° C. for 10 minutes | | | | — | ○ | ○○ | ○○ | ○○ | ○ | ○○ | ○ | ○ |
| | After curing and heating at 300° C. for 20 minutes | | | | Detachment high-temperature processing | ○ | x | ○ | ○ | ○ | ○ | ○ | ○○ |
| | | | | | Separability | ○ | x | ○○ | ○○ | ○ | ○○ | ○ | ○○ |

INDUSTRIAL APPLICABILITY

The present invention can provide a temporary fixing material that is easily separable even after high-temperature processing at 300° C. or higher with an adherend fixed thereon. The present invention can also provide a method for producing an electronic component using the temporary fixing material.

The invention claimed is:

1. A temporary fixing material comprising a photocurable adhesive,
the photocurable adhesive containing a reactive resin containing a resin (1) having an imide skeleton in a backbone repeating unit,
the temporary fixing material having a light transmittance at 405 nm of 10% or greater and a 5% weight loss temperature of 350° C. or higher,
wherein the resin (1) having an imide skeleton in a backbone repeating unit contains an aliphatic group derived from a dimer diamine.

2. The temporary fixing material according to claim 1,
wherein, when the photocurable adhesive is made into a photocurable adhesive layer containing the photocurable adhesive, the photocurable adhesive layer containing the photocurable adhesive has a modulus of elasticity at 25° C. of $1\times10^7$ Pa or greater and $401\times10^{10}$ Pa or less after being cured.

3. The temporary fixing material according to claim 1,
wherein, when the photocurable adhesive is made into a photocurable adhesive layer containing the photocurable adhesive, the photocurable adhesive layer containing the photocurable adhesive has a modulus of elasticity at 300° C. of $1\times10^8$ Pa or less after being cured.

4. The temporary fixing material according to claim 1,
wherein the aliphatic group derived from a dimer diamine is at least one selected from the group consisting of a group represented by the following formula (4-1), a group represented by the following formula (4-2), a group represented by the following formula (4-3), and a group represented by the following formula (4-4):

(4-1)

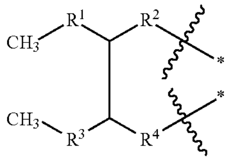

(4-2)

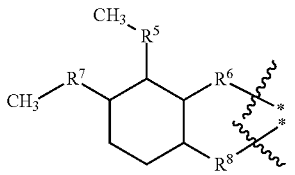

(4-3)

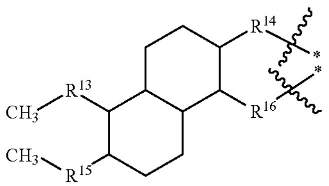

-continued (4-4)

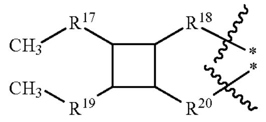

wherein $R^1$ to $R^8$ and $R^{13}$ to $R^{20}$ each independently represent a linear or branched hydrocarbon group.

5. The temporary fixing material according to claim 1,
wherein the resin (1) having an imide skeleton in a backbone repeating unit contains a resin (1-II) not containing a double bond-containing functional group and having an imide skeleton in a backbone repeating unit, and
the resin (1-11) not containing a double bond-containing functional group and having an imide skeleton in a backbone repeating unit has a weight average molecular weight (Mw) of 20,000 or greater.

6. The temporary fixing material according to claim 5,
wherein the resin (1-II) not containing a double bond-containing functional group and having an imide skeleton in a backbone repeating unit is a resin (2-i) containing a structural unit represented by the following formula (1d) and a structural unit represented by the following formula (1e):

(1d)

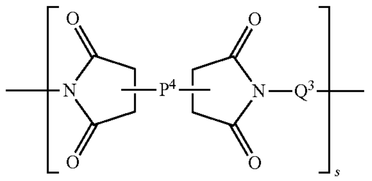

(1e)

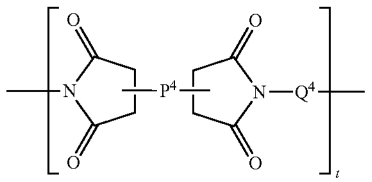

wherein the resin (1-II) has ends represented by $X^4$ and $X^5$, and
wherein s>0 and t≥0 are satisfied; $P^4$ and $P^5$ each independently represent an aromatic group;
$Q^3$ represents a substituted or unsubstituted linear, branched, or cyclic aliphatic group; $Q^4$ represents a substituted or unsubstituted aromatic structure-containing group; and $X^4$ and $X^5$ represents groups not containing a double bond-containing functional group.

7. The temporary fixing material according to claim 1,
wherein the resin (1) having an imide skeleton in a backbone repeating unit contains a resin (1-I) containing a double bond-containing functional group and having an imide skeleton in a backbone repeating unit.

8. The temporary fixing material according to claim 7,
wherein the resin (1-I) containing a double bond-containing functional group and having an imide skeleton in a backbone repeating unit is a compound (1-i) containing a structural unit represented by the following formula (1a), a structural unit represented by the following formula (1b), and a structural unit represented by the following formula (1c):

(1a)

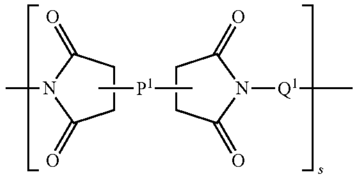

(1b)

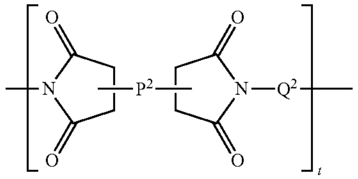

(1c)

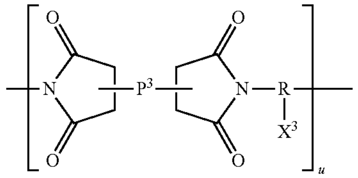

wherein the resin (1-I) has ends represented by $X^1$ and $X^2$, and wherein s>0, t≥0, and u≥0 are satisfied; $P^1$, $P^2$, and $P^3$ each independently represent an aromatic group; $Q^1$ represents a substituted or unsubstituted linear, branched, or cyclic aliphatic group; $Q^2$ represents a substituted or unsubstituted aromatic structure-containing group, R represents a substituted or unsubstituted branched aliphatic or aromatic group; and at least one selected from the group consisting of $X^1$, $X^2$, and $X^3$ represents a double bond-containing functional group.

9. The temporary fixing material according to claim 7, wherein the double bond-containing functional group is an optionally substituted maleimide group.

10. The temporary fixing material according to claim 1, wherein the reactive resin further contains a polyfunctional monomer or polyfunctional oligomer (2) containing two or more double bond-containing functional groups in a molecule and having a molecular weight of 5,000 or less.

11. The temporary fixing material according to claim 10, wherein the amount of the polyfunctional monomer or polyfunctional oligomer (2) containing two or more double bond-containing functional groups in a molecule and having a molecular weight of 5,000 or less is 5 parts by weight or greater and 100 parts by weight or less in 100 parts by weight of the reactive resin.

12. The temporary fixing material according to claim 7, wherein the amount of the resin (1-I) containing a double bond-containing functional group and having an imide skeleton in a backbone repeating unit is 10 parts by weight or greater and 100 parts by weight or less in 100 parts by weight of the reactive resin.

13. The temporary fixing material according to claim 5, wherein the amount of the resin (1-II) not containing a double bond-containing functional group and having an imide skeleton in a backbone repeating unit is 10 parts by weight or greater and 90 parts by weight or less in 100 parts by weight of the reactive resin.

14. The temporary fixing material according to claim 1, wherein the photocurable adhesive further contains a polymerization initiator, and the polymerization initiator is a photopolymerization initiator, and the photopolymerization initiator contains a photopolymerization initiator having a molar absorption coefficient at 405 nm of 1 or greater.

15. The temporary fixing material according to claim 1, wherein the photocurable adhesive further contains a silicone compound or a fluorine compound.

16. The temporary fixing material according to claim 1, wherein the photocurable adhesive further contains an inorganic filler.

17. The temporary fixing material according to claim 16, wherein the inorganic filler has an average particle size of 5 nm or greater and 20 μm or less.

18. The temporary fixing material according to claim 16, wherein the amount of the inorganic filler is 1 part by weight or greater and 20 parts by weight or less relative to 100 parts by weight of the reactive resin.

19. The temporary fixing material according to claim 1, wherein the photocurable adhesive further contains a gas generating agent.

20. The temporary fixing material according to claim 19, wherein the gas generating agent has a weight loss rate at 300° C. of 5% or less when heated from 30° C. to 300° C. at a heating rate of 10° C./min in a nitrogen atmosphere in thermogravimetry-differential thermal analysis (TG-DTA) measurement.

21. The temporary fixing material according to claim 19, comprising:

a first photocurable adhesive layer containing the photocurable adhesive; and a second adhesive layer.

22. The temporary fixing material according to claim 21, further comprising a substrate, wherein the first photocurable adhesive layer and the second adhesive layer are stacked on one surface and an opposite surface of the substrate, respectively.

23. The temporary fixing material according to claim 1, having an adhesion to glass at 25° C. of 1.5 N/inch or less after being cured and heated at 300° C. for 10 minutes.

24. The temporary fixing material according to claim 1, used for a production process of an electronic component.

25. A method for producing an electronic component, comprising:

a temporary fixing step of temporarily fixing an electronic component to the temporary fixing material according to claim 1;

a curing step of curing the photocurable adhesive of the temporary fixing material;

a heat treatment step of heat-treating the electronic component; and a separation step of separating the electronic component from the temporary fixing material.

26. A method for producing an electronic component using the temporary fixing material according to claim 21, comprising:

a support bonding step of bonding the first photocurable adhesive layer of the temporary fixing material and a support;

an adherend bonding step of bonding the second adhesive layer of the temporary fixing material and an electronic component;

a curing step of curing the first photocurable adhesive layer and the second adhesive layer;

a heat treatment step of heat-treating the electronic component;

a gas generation step of generating gas from the first photocurable adhesive layer; and a separation step of separating the support and the temporary fixing material from each other.

* * * * *